(12) United States Patent
Zhou et al.

(10) Patent No.: US 9,184,444 B2
(45) Date of Patent: Nov. 10, 2015

(54) ELECTRODES AND RECHARGEABLE BATTERIES

(75) Inventors: Hongxia Zhou, Ann Arbor, MI (US); George W. Adamson, Camarillo, CA (US)

(73) Assignee: ZPower, LLC, Camarillo, CA (US)

( * ) Notice: Subject to any disclaimer, the term of this patent is extended or adjusted under 35 U.S.C. 154(b) by 657 days.

(21) Appl. No.: 13/504,986

(22) PCT Filed: Nov. 3, 2010

(86) PCT No.: PCT/US2010/055204
§ 371 (c)(1),
(2), (4) Date: Jun. 18, 2012

(87) PCT Pub. No.: WO2011/056813
PCT Pub. Date: May 12, 2011

(65) Prior Publication Data
US 2013/0071744 A1    Mar. 21, 2013

Related U.S. Application Data

(60) Provisional application No. 61/257,576, filed on Nov. 3, 2009, provisional application No. 61/295,882, filed on Jan. 18, 2010.

(51) Int. Cl.
| | | |
|---|---|---|
| *H01M 4/54* | (2006.01) | |
| *H01M 10/32* | (2006.01) | |
| *H01M 4/34* | (2006.01) | |
| *H01M 4/38* | (2006.01) | |
| *H01M 4/62* | (2006.01) | |

(52) U.S. Cl.
CPC ........ *H01M 4/54* (2013.01); *H01M 4/34* (2013.01); *H01M 4/38* (2013.01); *H01M 10/32* (2013.01); *H01M 4/62* (2013.01); *H01M 4/621* (2013.01); *H01M 4/623* (2013.01); *Y02E 60/124* (2013.01)

(58) Field of Classification Search
CPC ......... H01M 4/34; H01M 4/362; H01M 4/38; H01M 4/54; H01M 4/621; H01M 4/62; H01M 10/32; Y02E 60/124
See application file for complete search history.

(56) References Cited

U.S. PATENT DOCUMENTS

| | | |
|---|---|---|
| 2,528,891 A | 11/1950 | Lawson |
| 3,017,448 A | 1/1962 | Cahan |
| 3,057,944 A | 10/1962 | Ruetschi et al. |
| 3,062,909 A | 11/1962 | Reutschi et al. |
| 3,325,311 A | 6/1967 | Huff |
| 3,920,478 A | 11/1975 | Kozawa |
| 3,954,501 A | 5/1976 | Rampel |
| 4,015,056 A | 3/1977 | Megahed et al. |
| 4,056,664 A | 11/1977 | Jaffe |
| 4,078,127 A | 3/1978 | Megahed et al. |
| 4,113,921 A | 9/1978 | Goldstein et al. |
| 4,125,689 A | 11/1978 | Jumel |
| 4,167,609 A | 9/1979 | Scarr |
| 4,298,506 A | 11/1981 | Przybyla et al. |
| 4,327,157 A | 4/1982 | Himy et al. |
| 4,407,915 A | 10/1983 | Brown |
| 4,465,747 A | 8/1984 | Evans |
| 4,520,087 A | 5/1985 | Kamata et al. |
| 4,835,077 A | 5/1989 | Megahed et al. |
| 5,017,446 A | 5/1991 | Reichman et al. |
| 5,240,793 A | 8/1993 | Glaeser |
| 5,272,020 A | 12/1993 | Flack |
| 5,281,497 A | 1/1994 | Kordesch et al. |
| 5,336,384 A | 8/1994 | Tsou et al. |
| 5,389,469 A | 2/1995 | Passaniti |
| 5,472,810 A | 12/1995 | Takeuchi et al. |
| 5,478,363 A | 12/1995 | Klein |
| 5,516,340 A | 5/1996 | Takeuchi et al. |
| 5,525,444 A | 6/1996 | Ito et al. |
| 5,558,680 A | 9/1996 | Takeuchi et al. |
| 5,589,109 A | 12/1996 | Passaniti et al. |
| 5,599,644 A | 2/1997 | Swierbut et al. |
| 5,658,688 A | 8/1997 | Jolson |
| 5,776,637 A | 7/1998 | Kashio et al. |
| 5,837,402 A | 11/1998 | Araki et al. |
| 5,981,105 A | 11/1999 | Smith et al. |
| 6,001,508 A | 12/1999 | Passaniti et al. |
| 6,054,084 A | 4/2000 | Khavari |
| 6,187,475 B1 | 2/2001 | Oh et al. |
| 6,203,947 B1 | 3/2001 | Peled et al. |
| 6,228,534 B1 | 5/2001 | Takeuchi et al. |
| 6,277,169 B1 | 8/2001 | Hampden-Smith et al. |

(Continued)

FOREIGN PATENT DOCUMENTS

| | | |
|---|---|---|
| EP | 0563773 | 10/1993 |
| EP | 1324408 | 7/2003 |

(Continued)

OTHER PUBLICATIONS

Dallenbach, R., et al.: "Synthesis of silver (II) oxide by oxidation of silver or silver oxide by means of ozone", Jan. 1, 1982, Polyhendron, Pergamon Press, Oxford, GB, pp. 183-186.

Himy, Albert; "Silver-Zinc Battery: Phenomena and Design Principles", Vantage Press, First Edition, 1986, pp. 26-33 and 67-75.

International Search Report for PCT/US2006/007332 dated Jul. 31, 2007.

International Search Report for PCT/US2009/001888 dated Jul. 30, 2009.

(Continued)

*Primary Examiner* — Laura Weiner
(74) *Attorney, Agent, or Firm* — Honigman Miller Schwartz and Cohn LLP; Andrew N. Weber; Jonathan P. O'Brien

(57) ABSTRACT

The present invention provides cathodes, methods of making cathodes, and electrochemical cells (e.g., batteries) that employ these cathodes having improved properties over traditional cathodes, methods, or electrochemical cells.

12 Claims, 15 Drawing Sheets

(56) References Cited

U.S. PATENT DOCUMENTS

| | | |
|---|---|---|
| 6,287,432 B1 | 9/2001 | Mazanec et al. |
| 6,589,612 B1 | 7/2003 | Cintra et al. |
| 6,685,752 B2 | 2/2004 | Leising et al. |
| 6,696,201 B2 | 2/2004 | Leising et al. |
| 6,797,019 B2 | 9/2004 | Takeuchi et al. |
| 6,830,710 B2 | 12/2004 | Bonnet et al. |
| 7,132,062 B1 | 11/2006 | Howard |
| 7,771,782 B2 | 8/2010 | Baiocchi |
| 8,936,775 B2 | 1/2015 | Adamson et al. |
| 2002/0127469 A1 | 9/2002 | Mori et al. |
| 2003/0157405 A1 | 8/2003 | Chen et al. |
| 2003/0207173 A1 | 11/2003 | Wang et al. |
| 2003/0215712 A1 | 11/2003 | Feddrix et al. |
| 2004/0101729 A1 | 5/2004 | Kearl |
| 2004/0202926 A1 | 10/2004 | Clark et al. |
| 2005/0074394 A1 | 4/2005 | Berube et al. |
| 2005/0175529 A1 | 8/2005 | Ceder et al. |
| 2005/0181280 A1 | 8/2005 | Ceder et al. |
| 2006/0228629 A1 | 10/2006 | Christian et al. |
| 2007/0184334 A1 | 8/2007 | Hong et al. |
| 2008/0038630 A1 | 2/2008 | Cheiky |
| 2010/0047689 A1* | 2/2010 | Bugnet et al. ............... 429/217 |
| 2010/0119941 A1 | 5/2010 | Niessen et al. |
| 2011/0262803 A1 | 10/2011 | Huang et al. |
| 2011/0286912 A1 | 11/2011 | Adamson et al. |
| 2012/0164526 A1 | 6/2012 | Adamson et al. |
| 2013/0216901 A1 | 8/2013 | Ortega et al. |
| 2013/0230774 A1 | 9/2013 | Ortega et al. |
| 2014/0227591 A1 | 8/2014 | Adamson et al. |

FOREIGN PATENT DOCUMENTS

| | | | |
|---|---|---|---|
| EP | 1775787 | | 4/2007 |
| GB | 902846 | | 8/1962 |
| GB | 1065059 | | 4/1967 |
| GB | 2019079 | | 10/1979 |
| JP | 53-80530 | | 7/1978 |
| JP | 54-008839 | | 1/1979 |
| JP | 56-149771 | | 11/1981 |
| JP | 58-119156 | | 7/1983 |
| JP | 59-132567 | | 7/1984 |
| JP | 59-184459 | | 10/1984 |
| JP | 60-189164 | | 9/1985 |
| JP | 2000-164220 | * | 6/2000 |
| JP | 2001-185116 | | 7/2001 |
| JP | 2004-213927 | | 7/2004 |
| WO | 03/096448 | | 11/2003 |
| WO | 2006/104633 | | 10/2006 |
| WO | 2008/004105 | | 1/2008 |
| WO | 2008/007288 | | 1/2008 |
| WO | WO 2008/004105 | * | 1/2008 |
| WO | 2009/120352 | | 10/2009 |
| WO | 2010/051356 | | 5/2010 |
| WO | 2010/111567 | | 9/2010 |
| WO | 2012/040298 | | 3/2012 |
| WO | 2012/061449 | | 5/2012 |
| WO | 2014/052533 | | 4/2014 |

OTHER PUBLICATIONS

International Search Report for PCT/US2009/062516 dated Feb. 12, 2010.

International Search Report for PCT/US2010/028772 dated Jun. 9, 2010.

International Search Report for PCT/US2010/055204 dated Mar. 3, 2011.

International Search Report for PCT/US2011/052504 Dated Dec. 28, 2011.

International Search Report for PCT/US2011/058877 Dated Feb. 8, 2012.

Jirsa, F., et al. "studien uber hohere Silberoxyde", Z. Anorg Undallg. Chemie, vol. 158, Dec. 31, 1926, pp. 61-66.

Kendall, James, et al., "The Catalytic Influence of Foreign Oxides on the Decomposition of Silver Oxide, Mercuric Oxide and Barium Peroxide", Department of Organic Chemistry, Columbia Unioversity, No. 373, 1921, pp. 2017-2031.

Makosza, Mieczyslaw, et al., "Convenient Preparation of Metals Deposited on Supports and Their Use in Organic Synthesis", Tetrahedron, vol. 54, 1998, pp. 10827-10836.

McMillan, J. A., "Higher Oxidation States of Silver", Argonne National Laboratory, Jul. 28, 1961, pp. 65-80.

Tvarusko, Aladar, "The Decomposition of AgO in Alkaline Solutions", Journal of the Electrochemical Society, vol. 116, No. 8, Aug. 1969, pp. 1070-1075.

Tvarusko, Aladar, "The Electric Resistivity of AgO", Journal of the Electrochemical Society, vol. 115, No. 11, Nov. 1968, pp. 1105-1110.

Wales, C. P., et al., "Feasibility of Microscopy for Investigating the Silver Oxide Electrode", Navel Research Laboratory, Washington, D.C., Jan. 9, 1968, NRL Report 6647, complete document.

International Search Report for PCT/US2013/061834 dated Feb. 26, 2014.

* cited by examiner

ELECTRODES AND RECHARGEABLE BATTERIES

CROSS-REFERENCE TO RELATED APPLICATIONS

This application claims the benefit of PCT Application Serial No. PCT/2010/055204, which was filed on Nov. 30, 2010 claiming the benefit of U.S. Patent Application No. 61/257,576, filed on Nov. 3, 2009, and U.S. Patent Application No. 61/295,882, filed on Jan. 18, 2010. These documents are hereby incorporated by reference in their entireties.

FIELD OF THE INVENTION

This invention relates to a novel cathode formed by mixing a stabilizing agent with a cathode active material to form an electrode having improved properties over traditional cathodes.

BACKGROUND

Rechargeable batteries are known in the art and commonly used, for example, in portable electronic devices. Although conventional rechargeable batteries are useful, the systems and methods used to recharge the batteries are nevertheless susceptible to improvements that may enhance or improve their service life, shelf life, and/or performance.

When a traditional battery is discharged, the anode supplies positive ions to an electrolyte and electrons to an external circuit. The cathode is typically an electronically conducting host into which positive ions are inserted reversibly from the electrolyte as a guest species and are charge-compensated by electrons from the external circuit. A secondary battery, or cell, uses a reaction that can be reversed when current is applied to the battery; thus, "recharging" the battery. The chemical reactions at the anode and cathode of a secondary battery must be reversible. On charge, the removal of electrons from the cathode by an external field releases positive ions back to the electrolyte to restore the parent host structure, and the addition of electrons to the anode by the external field attracts charge-compensating positive ions back into the anode to restore it to its original composition.

Traditional electrode material's such as cathode materials suffer a number of drawbacks. For instance, many traditional cathodes lose charge capacity over several charge cycles, they are Coulombically inefficient, or they possess an elevated impedance or internal resistance that negatively effects battery discharge. As many traditional batteries progress through charge cycles, these deleterious effects generally cause an increased hindrance on battery performance.

Thus, there is a need for electrode materials that have improved properties and can improve battery performance.

SUMMARY OF THE INVENTION

The present invention provides a novel cathode material that comprises silver that is associated with one or more particles of a stabilizing agent, wherein the one or more particles of stabilizing agent have a diameter or mean diameter of less than about 250 nm (e.g., about 100 nm or less).

One aspect of the present invention provides a cathode for use in a rechargeable battery comprising a cathode active material comprising a stabilizing agent comprising a powder having a mean particle diameter of about 250 nm or less (e.g., about 100 nm or less); and silver, wherein the stabilizing agent is present in an amount sufficient to impart the cathode with a Coulombic efficiency of greater than about 98%.

In some embodiments, the cathode active material comprises silver, and the silver comprises Ag, AgO, $Ag_2O$, $Ag_2O_3$, AgOH, $Ag(OH)_2$, $Ag(OH)_3$, AgOOH, AgONa, AgOK, AgOLi, AgORb, AgOONa, AgOOK, AgOOLi, AgOORb, $AgCuO_2$, $AgFeO_2$, $AgMnO_2$, $Ag_2CuMnO_4$, any hydrate thereof, or any combination thereof. In other embodiments, the silver further comprises Pb, B, Al, Ga, Zn, Ni, Pd, In, Fe, or any combination thereof. For example, the silver is doped with a first dopant comprising Pb, B, Al, Ga, Zn, Ni, Pd, In, Fe, or any combination thereof. In another example, the silver is doped with a first dopant comprising Ga. In alternative examples, silver is coated with a coating agent comprising Pb, B, Al, Ga, Zn, Ni, Pd, In, Fe, or any combination thereof. In some instances, the silver is coated with a coating agent comprising Pb. And, in other examples, the silver is doped with a first dopant comprising Ga, and the silver is coated with a coating agent comprising Pb.

In some embodiments, the stabilizing agent comprises a powder comprising a p-type semiconductor, an n-type semiconductor, or any combination thereof. For example, the stabilizing agent comprises a powder comprising ZnO, $SiO_2$, $ZrO_2$, $TiO_2$, $Al_2O_3$, MgO, SiC, $In_2O_3$, $Ho_2O_3$, $ZnTiO_3$, $Bi_2O_3$, $LiAlO_2$, $BaTiO_3$, $Li_{4-x}Ca_xSiO_4$, $Li_{4-x}Mg_xSiO_4$, $Bi_2O_3$, $Yb_2O_3$, $MnO_2$, Ultramarine, or any combination thereof, wherein x is 1-4. In alternative examples, the stabilizing agent comprises a powder comprising ZnO. And, in some examples, the ZnO is doped with a second dopant comprising $Al_2O_3$, iron oxide, indium oxide, or any combination thereof. In some instances, the ZnO is doped with a second dopant comprising $Al_2O_3$. In other examples, the stabilizing agent comprises a powder comprising $ZrO_2$. And, in some examples, the stabilizing agent comprises a powder comprising $SiO_2$. In some examples, the stabilizing agent comprises a powder, and the powder comprises a plurality of particles comprising $SiO_2$, $ZrO_2$, and ZnO. In other examples, the stabilizing agent comprises a powder comprising $SiO_2$ particles, $ZrO_2$ particles, and ZnO particles. In some instances, the ZnO particles are doped with a second dopant comprising $Al_2O_3$. In other instances, the ZnO particles comprise from about 1 wt % to about 10 wt % of $Al_2O_3$ by weight of the ZnO particles.

In some embodiments, the cathode active material comprises about 0.5 wt % or less (e.g., about 0.2 wt % or less) of the stabilizing agent. For example, the cathode active material comprises from about 0.01 wt % to about 0.3 wt % (e.g., from about 0.01 wt % to about 0.2 wt %) of the stabilizing agent.

In other embodiments, the cathode further comprises a binder. For example, the cathode comprises a binder comprising PTFE.

Another aspect of the present invention provides a rechargeable battery comprising a cathode comprising a cathode active material comprising silver and a stabilizing agent; an anode comprising zinc; and an electrolyte, wherein the stabilizing agent comprises a powder having a mean particle diameter of about 250 nm or less (e.g., about 100 nm or less), the silver associates with one or more particles of the stabilizing agent, and the stabilizing agent is present in an amount sufficient to impart the cathode with a Coulombic efficiency of greater than about 98%.

In some embodiments, the silver comprises Ag, AgO, $Ag_2O$, $Ag_2O_3$, AgOH, $Ag(OH)_2$, $Ag(OH)_3$, AgOOH, AgONa, AgOK, AgOLi, AgORb, AgOONa, AgOOK, AgOOLi, AgOORb, $AgCuO_2$, $AgFeO_2$, $AgMnO_2$, $Ag_2CuMnO_4$, any hydrate thereof, or any combination thereof. In other embodiments, the silver further comprises Pb, B, Al, Ga, Zn, Ni, Pd, In, Fe, or any combination thereof. For example, the silver is doped with a first dopant comprising Pb, B, Al, Ga, Zn, Ni, Pd, In, Fe, or any combination thereof. In some instances, the silver is doped with a first dopant comprising Ga. In other examples, the silver is coated with a coating agent comprising Pb, B, Al, Ga, Zn, Ni, Pd, In, Fe, or any combination thereof. For instance, the silver is coated with a coating agent comprising Pb. In some instances, the silver is coated with a coating agent comprising Pb, and the silver is doped with a first dopant comprising Ga.

In some embodiments, the stabilizing agent comprises a powder comprising a p-type semiconductor, an n-type semiconductor, or any combination thereof. For example, the stabilizing agent comprises a powder comprising ZnO, $SiO_2$, $ZrO_2$, $TiO_2$, $Al_2O_3$, MgO, SiC, $In_2O_3$, $Ho_2O_3$, $ZnTiO_3$, $Bi_2O_3$, $LiAlO_2$, $BaTiO_3$, $Li_{4-x}Ca_xSiO_4$, $Li_{4-x}Mg_xSiO_4$, $Bi_2O_3$, $Yb_2O_3$, $MnO_2$, Ultramarine, or any combination thereof, wherein x is 1-4. In alternative examples, the stabilizing agent comprises a powder comprising ZnO. And, in some examples, the ZnO is doped with a second dopant comprising $Al_2O_3$, iron oxide, indium oxide, or any combination thereof. In some instances, the ZnO is doped with a second dopant comprising $Al_2O_3$. In other examples, the stabilizing agent comprises a powder comprising $ZrO_2$. And, in some examples, the stabilizing agent comprises a powder comprising $SiO_2$. In some examples, the stabilizing agent comprises a powder, and the powder comprises a plurality of particles comprising $SiO_2$, $ZrO_2$, and ZnO. In other examples, the stabilizing agent comprises a powder comprising $SiO_2$ particles, $ZrO_2$ particles, and ZnO particles. In some instances, the ZnO particles are doped with a second dopant comprising $Al_2O_3$. In other instances, the ZnO particles comprise from about 1 wt % to about 10 wt % of $Al_2O_3$ by weight of the ZnO particles.

In other embodiments, the cathode active material comprises about 7 wt % or less (e.g., about 0.5 wt % or less) of the stabilizing agent. For example, the cathode active material comprises from about 0.01 wt % to about 0.3 wt % (e.g., from about 0.01 wt % to about 0.2 wt %) of the stabilizing agent.

And, in some embodiments, the cathode further comprises a binder. For example, the cathode further comprises a binder, and the binder comprises PTFE.

Another aspect of the present invention provides an electrochemical cell comprising a cathode comprising a cathode active material comprising silver and a stabilizing agent; an anode comprising Zn; and an electrolyte, wherein the stabilizing agent comprises a powder having a mean particle diameter of about 250 nm or less (e.g., about 100 nm or less), the silver is associated with at least one particle of a stabilizing agent, and the cathode active material comprises a sufficient amount of stabilizing agent such that the cell retains a substantially constant charge capacity after more than about 70 charge cycles.

In some embodiments, the silver comprises Ag, AgO, $Ag_2O$, $Ag_2O_3$, AgOH, $Ag(OH)_2$, $Ag(OH)_3$, AgOOH, AgONa, AgOK, AgOLi, AgORb, AgOONa, AgOOK, AgOOLi, AgOORb, $AgCuO_2$, $AgFeO_2$, $AgMnO_2$, $Ag_2CuMnO_4$, any hydrate thereof, or any combination thereof. In other embodiments, the silver further comprises Pb, B, Al, Ga, Zn, Ni, Pd, In, Fe, or any combination thereof. For example, the silver is doped with a first dopant comprising Pb, B, Al, Ga, Zn, Ni, Pd, In, Fe, or any combination thereof. In other examples, the silver is coated with a coating agent comprising Pb, B, Al, Ga, Zn, Ni, Pd, In, Fe, or any combination thereof. For instance, the silver is coated with a coating agent comprising Pb. In some instances, the silver is coated with a coating agent comprising Pb, and the silver is doped with a first dopant comprising Ga.

In some embodiments, the stabilizing agent comprises a powder comprising a p-type semiconductor, an n-type semiconductor, or any combination thereof. For example, the stabilizing agent comprises a powder comprising ZnO, $SiO_2$, $ZrO_2$, $TiO_2$, $Al_2O_3$, MgO, SiC, $In_2O_3$, $Ho_2O_3$, $ZnTiO_3$, $Bi_2O_3$, $LiAlO_2$, $BaTiO_3$, $Li_{4-x}Ca_xSiO_4$, $Li_{4-x}Mg_xSiO_4$, $Bi_2O_3$, $Yb_2O_3$, $MnO_2$, Ultramarine, or any combination thereof, wherein x is 1-4. In alternative examples, the stabilizing agent comprises a powder comprising ZnO. And, in some examples, the ZnO is doped with a second dopant comprising $Al_2O_3$, iron oxide, indium oxide, or any combination thereof. In some instances, the ZnO is doped with a second dopant comprising $Al_2O_3$. In other examples, the stabilizing agent comprises a powder comprising $ZrO_2$. And, in some examples, the stabilizing agent comprises a powder comprising $SiO_2$. In some examples, the stabilizing agent comprises a powder, and the powder comprises a plurality of particles comprising $SiO_2$, $ZrO_2$, and ZnO. In other examples, the stabilizing agent comprises a powder comprising $SiO_2$ particles, $ZrO_2$ particles, and ZnO particles. In some instances, the ZnO particles are doped with a second dopant comprising $Al_2O_3$. In other instances, the ZnO particles comprise from about 1 wt % to about 10 wt % of $Al_2O_3$ by weight of the ZnO particles.

In other embodiments, the cathode active material comprises about 7 wt % or less (e.g., about 0.5 wt % or less or about 0.2 wt % or less) of the stabilizing agent. For example, the cathode active material comprises from about 0.01 wt % to about 0.3 wt % (e.g., from about 0.01 wt % to about 0.2 wt %) of the stabilizing agent.

Another aspect of the present invention provides a rechargeable battery comprising a cathode comprising a cathode active material comprising silver and a stabilizing agent; an anode comprising zinc; and an electrolyte, wherein the stabilizing agent comprises a powder having a mean particle diameter of about 250 nm or less (e.g., about 100 nm or less), and the rechargeable battery provides at least about 200 mAh/g of silver per discharge for a period of at least about 100 consecutive charge cycles.

In some embodiments, the battery provides at least about 200 mAh/g of silver per discharge for a period of at least about 120 consecutive charge cycles. In other embodiments, the battery provides more than about 200 mAh/g of silver per discharge for a period of at least about 100 consecutive charge cycles. And, in some embodiments, the battery provides at least about 20 Ah/g of silver of aggregate capacity over a period of no more than about 250 consecutive charge cycles.

In some embodiments, the silver comprises Ag, AgO, $Ag_2O$, $Ag_2O_3$, AgOH, $Ag(OH)_2$, $Ag(OH)_3$, AgOOH, AgONa, AgOK, AgOLi, AgORb, AgOONa, AgOOK, AgOOLi, AgOORb, $AgCuO_2$, $AgFeO_2$, $AgMnO_2$, $Ag_2CuMnO_4$, any hydrate thereof, or any combination thereof. In other embodiments, the silver further comprises Pb, B, Al, Ga, Zn, Ni, Pd, In, Fe, or any combination thereof. For example, the silver is doped with a first dopant comprising Pb, B, Al, Ga, Zn, Ni, Pd, In, Fe, or any combination thereof. In other examples, the silver is coated with a coating agent comprising Pb, B, Al, Ga, Zn, Ni, Pd, In, Fe, or any combination thereof. For instance, the silver is coated with a coating agent comprising Pb. In some instances, the silver is coated with a coating agent comprising Pb, and the silver is doped with a first dopant comprising Ga.

In some embodiments, the stabilizing agent comprises a powder comprising a p-type semiconductor, an n-type semiconductor, or any combination thereof. For example, the stabilizing agent comprises a powder comprising ZnO, $SiO_2$, $ZrO_2$, $TiO_2$, $Al_2O_3$, MgO, SiC, $In_2O_3$, $Ho_2O_3$, $ZnTiO_3$, $Bi_2O_3$, $LiAlO_2$, $BaTiO_3$, $Li_{4-x}Ca_xSiO_4$, $Li_{4-x}Mg_xSiO_4$, $Bi_2O_3$, $Yb_2O_3$, $MnO_2$, Ultramarine, or any combination thereof, wherein x is 1-4. In other examples, the stabilizing agent comprises a powder comprising ZnO. In some instances, the ZnO is doped with a second dopant comprising $Al_2O_3$, iron oxide, indium oxide, or any combination thereof. For example, the ZnO is doped with a second dopant comprising $Al_2O_3$. In other examples, the stabilizing agent comprises a powder comprising $ZrO_2$. And, in some examples, the stabilizing agent comprises a powder comprising $SiO_2$. In alternative examples, the stabilizing agent comprises a powder, and the powder comprises a plurality of particles comprising $SiO_2$, $ZrO_2$, and ZnO. In some examples, the stabilizing agent comprises a powder comprising $SiO_2$ particles, $ZrO_2$ particles, and ZnO particles. In some instances, the ZnO particles are doped with a second dopant comprising $Al_2O_3$. For example, ZnO particles are doped with from about 1 wt % to about 10 wt % of a second dopant comprising $Al_2O_3$ by weight of the ZnO particles.

In other embodiments, the cathode active material comprises about 7 wt % or less (e.g., about 0.5 wt % or less) of the stabilizing agent. For example, the cathode active material comprises from about 0.01 wt % to about 0.3 wt % (e.g., from about 0.01 wt % to about 0.2 wt %) of the stabilizing agent.

And, in some embodiments, the cathode material further comprises a binder, such as PTFE.

Another aspect of the present invention provides a rechargeable battery comprising a cathode comprising a cathode active material comprising silver and a stabilizing agent; an anode comprising zinc; and an electrolyte, wherein the stabilizing agent comprises a powder having a mean particle diameter of about 250 nm or less (e.g., about 100 nm or less), and the rechargeable battery provides a battery capacity of at least about 140 mAh/g of silver per discharge for a period of at least about 100 consecutive charge cycles.

In some embodiments, the battery provides a battery capacity of at least about 144) mAh/g of silver per discharge for a period of at least about 150 consecutive charge cycles. In other embodiments, the battery provides a battery capacity of more than about 140 mAh/g of silver per discharge for a period of at least about 100 consecutive charge cycles. In some embodiments, the battery provides at least about 14 Ah/g of silver aggregate capacity over a period of no more than about 1000 consecutive charge cycles. And, in other embodiments, the battery provides at least about 200 mAh/g of silver per discharge for a period of at least about 150 consecutive charge cycles.

In some embodiments, the silver comprises Ag, AgO, $Ag_2O$, $Ag_2O_3$, AgOH, $Ag(OH)_2$, $Ag(OH)_3$, AgOOH, AgONa, AgOK, AgOLi, AgORb, AgOONa, AgOOK, AgOOLi, AgOORb, $AgCuO_2$, $AgFeO_2$, $AgMnO_2$, $Ag_2CuMnO_4$, any hydrate thereof, or any combination thereof. In other embodiments, the silver further comprises Pb, B, Al, Ga, Zn, Ni, Pd, In, Fe, or any combination thereof. For example, the silver is doped with a first dopant comprising Pb, B, Al, Ga, Zn, Ni, Pd, In, Fe, or any combination thereof. In other examples, the silver is coated with a coating agent comprising Pb, B, Al, Ga, Zn, Ni, Pd, In, Fe, or any combination thereof. For instance, the silver is coated with a coating agent comprising Pb. In some instances, the silver is coated with a coating agent comprising Pb, and the silver is doped with a first dopant comprising Ga.

In some embodiments, the stabilizing agent comprises a powder comprising a p-type semiconductor, an n-type semiconductor, or any combination thereof. For example, the stabilizing agent comprises a powder comprising ZnO, $SiO_2$, $ZrO_2$, $TiO_2$, $Al_2O_3$, MgO, SiC, $In_2O_3$, $Ho_2O_3$, $ZnTiO_3$, $Bi_2O_3$, $LiAlO_2$, $BaTiO_3$, $Li_{4-x}Ca_xSiO_4$, $Li_{4-x}Mg_xSiO_4$, $Bi_2O_3$, $Yb_2O_3$, $MnO_2$, Ultramarine, or any combination thereof, wherein x is 1-4. In alternative examples, the stabilizing agent comprises a powder comprising ZnO. And, in some examples, the ZnO is doped with a second dopant comprising $Al_2O_3$, iron oxide, indium oxide, or any combination thereof. In some instances, the ZnO is doped with a second dopant comprising $Al_2O_3$. In other examples, the stabilizing agent comprises a powder comprising $ZrO_2$. And, in some examples, the stabilizing agent comprises a powder comprising $SiO_2$. In some examples, the stabilizing agent comprises a powder, and the powder comprises a plurality of particles comprising $SiO_2$, $ZrO_2$, and ZnO. In other examples, the stabilizing agent comprises a powder comprising $SiO_2$ particles, $ZrO_2$ particles, and ZnO particles. In some instances, the ZnO particles are doped with a second dopant comprising $Al_2O_3$. In other instances, the ZnO particles comprise from about 1 wt % to about 10 wt % of $Al_2O_3$ by weight of the ZnO particles.

In other embodiments, the cathode active material comprises about 0.5 wt % or less (e.g., about 0.2 wt % or less) of the stabilizing agent. For example, the cathode active material comprises from about 0.01 wt % to about 0.3 wt % (e.g., from about 0.01 wt % to about 0.2 wt %) of the stabilizing agent.

Another aspect of the present invention provides a rechargeable battery comprising a cathode comprising a cathode active material comprising silver and a stabilizing agent; an anode comprising zinc; and an electrolyte, wherein the stabilizing agent comprises a powder having a mean particle diameter of about 250 nm or less (e.g., about 100 nm or less), and the rechargeable battery provides at least about 12 Ah of aggregate battery capacity per gram of silver over a period of no more than about 1000 consecutive charge cycles.

In some embodiments, the silver comprises Ag, AgO, $Ag_2O$, $Ag_2O_3$, AgOH, $Ag(OH)_2$, $Ag(OH)_3$, AgOOH, AgONa, AgOK, AgOLi, AgORb, AgOONa, AgOOK, AgOOLi, AgOORb, $AgCuO_2$, $AgFeO_2$, $AgMnO_2$, $Ag_2CuMnO_4$, any hydrate thereof, or any combination thereof. In other embodiments, the silver further comprises Pb, B, Al, Ga, Zn, Ni, Pd, In, Fe, or any combination thereof. For example, the silver is doped with a first dopant comprising Pb, B, Al, Ga, Zn, Ni, Pd, In, Fe, or any combination thereof. In other examples, the silver is coated with a coating agent comprising Pb, B, Al, Ga, Zn, Ni, Pd, In, Fe, or any combination thereof. For instance, the silver is coated with a coating agent comprising Pb. In some instances, the silver is coated with a coating agent comprising Pb, and the silver is doped with a first dopant comprising Ga.

In some embodiments, the stabilizing agent comprises a powder comprising a p-type semiconductor, an n-type semiconductor, or any combination thereof. For example, the stabilizing agent comprises a powder comprising ZnO, $SiO_2$, $ZrO_2$, $TiO_2$, $Al_2O_3$, MgO, SiC, $In_2O_3$, $Ho_2O_3$, $ZnTiO_3$, $Bi_2O_3$, $LiAlO_2$, $BaTiO_3$, $Li_{4-x}Ca_xSiO_4$, $Li_{4-x}Mg_xSiO_4$, $Bi_2O_3$, $Yb_2O_3$, $MnO_2$, Ultramarine, or any combination thereof, wherein x is 1-4. In alternative examples, the stabilizing agent comprises a powder comprising ZnO. And, in some examples, the ZnO is doped with a second dopant comprising $Al_2O_3$, iron oxide, indium oxide, or any combination thereof. In some instances, the ZnO is doped with a second dopant comprising $Al_2O_3$. In other examples, the stabilizing agent comprises a powder comprising $ZrO_2$. And, in some examples, the stabilizing agent comprises a powder comprising $SiO_2$. In some examples, the stabilizing agent comprises a powder, and the powder comprises a plurality of particles comprising $SiO_2$, $ZrO_2$, and ZnO. In other examples, the stabilizing agent comprises a powder comprising $SiO_2$ particles, $ZrO_2$ particles, and ZnO particles. In some instances, the ZnO particles are doped with a second dopant comprising $Al_2O_3$. In other instances, the ZnO particles comprise from about 1 wt % to about 10 wt % of $Al_2O_3$ by weight of the ZnO particles.

In other embodiments, the cathode active material comprises about 0.5 wt % or less (e.g., about 0.2 wt % or less) of the stabilizing agent. For example, the cathode active material comprises from about 0.01 wt % to about 0.3 wt % (e.g., from about 0.01 wt % to about 0.2 wt %) of the stabilizing agent.

Another aspect of the present invention provides a method of producing a cathode comprising providing silver; providing a stabilizing agent comprising a powder having a mean particle diameter of no more than about 250 nm (e.g., about 100 nm or less); and associating the silver material with one or more particles of the stabilizing agent.

In some methods, the silver comprises Ag, AgO, $Ag_2O$, $Ag_2O_3$, AgOH, $Ag(OH)_2$, $Ag(OH)_3$, AgOOH, AgONa, AgOK, AgOLi, AgORb, AgOONa, AgOOK, AgOOLi, AgOORb, $AgCuO_2$, $AgFeO_2$, $AgMnO_2$, $Ag_2CuMnO_4$, any hydrate thereof, or any combination thereof. In other methods, the silver further comprises Pb, B, Al, Ga, Zn, Ni, Pd, In, Fe, or any combination thereof. For example, the silver is doped with a first dopant comprising Pb, B, Al, Ga, Zn, Ni, Pd, In, Fe, or any combination thereof. In some instances, the silver is doped with a first dopant comprising Ga. In other examples, the silver is coated with a coating agent comprising Pb, B, Al, Ga, Zn, Ni, Pd, In, Fe, or any combination thereof. For instance, the silver is coated with a coating agent comprising Pb. In some instances, the silver is coated with a coating agent comprising Pb, and the silver is doped with a first dopant comprising Ga.

In other methods, the stabilizing agent comprises a powder comprising ZnO, $SiO_2$, $ZrO_2$, $TiO_2$, $Al_2O_3$, MgO, SiC, $In_2O_3$, $Ho_2O_3$, $ZnTiO_3$, $Bi_2O_3$, $LiAlO_2$, $BaTiO_3$, $Li_{4-x}Ca_xSiO_4$, $Li_{4-x}Mg_xSiO_4$, $Bi_2O_3$, $Yb_2O_3$, $MnO_2$, Ultramarine, or any combination thereof, wherein x is 1-4. For example, the stabilizing agent comprises a powder comprising ZnO. In some instances, the ZnO is doped with a second dopant comprising $Al_2O_3$, iron oxide, indium oxide, or any combination thereof. For example, the ZnO is doped with a second dopant comprising $Al_2O_3$. In other examples, the stabilizing agent comprises a powder comprising $ZrO_2$. And, in some examples, the stabilizing agent comprises a powder comprising $SiO_2$. In alternative examples, the stabilizing agent comprises a powder, and the powder comprises a plurality of particles comprising $SiO_2$, $ZrO_2$, and ZnO. In some examples, the stabilizing agent comprises a powder comprising $SiO_2$ particles, $ZrO_2$ particles, and ZnO particles. In some instances, the ZnO particles are doped with a second dopant comprising $Al_2O_3$. For example, ZnO particles are doped with from about 1 wt % to about 10 wt % of a second dopant comprising $Al_2O_3$ by weight of the ZnO particles.

Some methods further comprise providing about 7 wt % or less (e.g., about 0.5 wt % or less) of the stabilizing agent. For example, providing from about 0.01 wt % to about 0.2 wt % of the stabilizing agent.

Another aspect of the present invention provides a method of improving the Coulombic efficiency of a silver cathode comprising adding a stabilizing agent to the silver cathode, wherein the stabilizing agent comprises a powder, and the powder has a mean particle diameter of no more than 100 nm.

In some methods, the silver comprises Ag, AgO, $Ag_2O$, $Ag_2O_3$, AgOH, $Ag(OH)_2$, $Ag(OH)_3$, AgOOH, AgONa, AgOK, AgOLi, AgORb, AgOONa, AgOOK, AgOOLi, AgOORb, $AgCuO_2$, $AgFeO_2$, $AgMnO_2$, $Ag_2CuMnO_4$, any hydrate thereof, or any combination thereof. In other methods, the silver further comprises Pb, B, Al, Ga, Zn, Ni, Pd, In, Fe, or any combination thereof. For example, the silver is doped with a first dopant comprising Pb, B, Al, Ga, Zn, Ni, Pd, In, Fe, or any combination thereof. In some instances, the silver is doped with a first dopant comprising Ga. In other examples, the silver is coated with a coating agent comprising Pb, B, Al, Ga, Zn, Ni, Pd, In, Fe, or any combination thereof. For instance, the silver is coated with a coating agent comprising Pb. In some instances, the silver is coated with a coating agent comprising Pb, and the silver is doped with a first dopant comprising Ga.

In other methods, the stabilizing agent comprises a powder comprising a p-type semiconductor, an n-type semiconductor, or any combination thereof. For example, the stabilizing agent comprises a powder comprising ZnO, $SiO_2$, $ZrO_2$, $TiO_2$, $Al_2O_3$, MgO, SiC, $In_2O_3$, $Ho_2O_3$, $ZnTiO_3$, $Bi_2O_3$, $LiAlO_2$, $BaTiO_3$, $Li_{4-x}Ca_xSiO_4$, $Li_{4-x}Mg_xSiO_4$, $Bi_2O_3$, $Yb_2O_3$, $MnO_2$, Ultramarine, or any combination thereof, wherein x is 1-4. In alternative examples, the stabilizing agent comprises a powder comprising ZnO. And, in some examples, the ZnO is doped with a second dopant comprising $Al_2O_3$, iron oxide, indium oxide, or any combination thereof. In some instances, the ZnO is doped with a second dopant comprising $Al_2O_3$. In other examples, the stabilizing agent comprises a powder comprising $ZrO_2$. And, in some examples, the stabilizing agent comprises a powder comprising $SiO_2$. In some examples, the stabilizing agent comprises a powder, and the powder comprises a plurality of particles comprising $SiO_2$, $ZrO_2$, and ZnO. In other examples, the stabilizing agent comprises a powder comprising $SiO_2$ particles, $ZrO_2$ particles, and ZnO particles. In some instances, the ZnO particles are doped with a second dopant comprising $Al_2O_3$. In other instances, the ZnO particles comprise from about 1 wt % to about 10 wt % of $Al_2O_3$ by weight of the ZnO particles.

Some methods further comprise adding about 7 wt % or less (e.g., about 0.5 wt % or less) of the stabilizing agent by weight of the silver cathode. For example, adding from about 0.01 wt % to about 0.2 wt % of the stabilizing agent.

In some methods, the silver cathode further comprises a binder such as PTFE.

BRIEF DESCRIPTION OF THE DRAWINGS

The disclosure will now be described, by way of example, with reference to the accompanying drawings, in which.

DETAILED DESCRIPTION OF THE INVENTION

Figure 1:
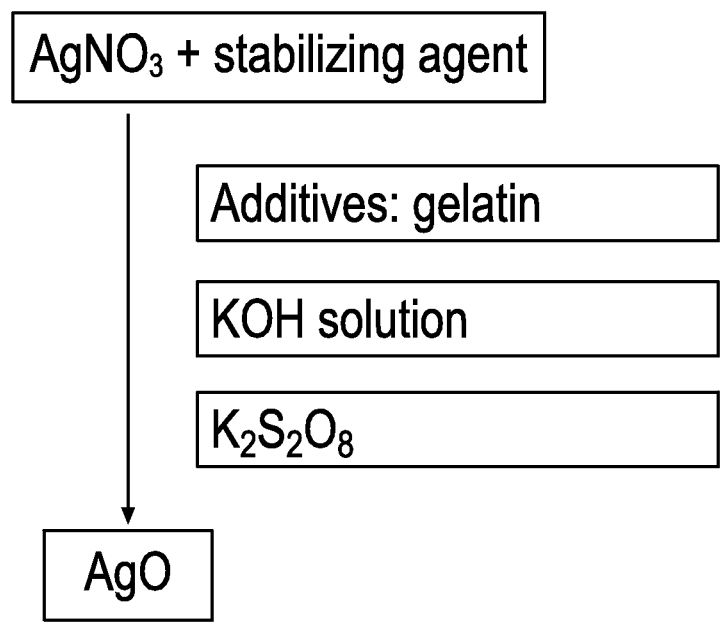
FIG. 1 is a flow diagram that illustrates the steps of an exemplary method for producing cathode material according to one aspect of the present invention.

The present invention provides cathodes, methods of making cathodes, and electrochemical cells (e.g., batteries) that have improved properties over traditional cathodes, methods, or electrochemical cells.

I. Definitions

As used herein, the term "battery" encompasses electrical storage devices comprising one electrochemical cell (e.g., a button cell, a coin cell, or the like) or a plurality of electrochemical cells. A "secondary battery" is rechargeable, whereas a "primary battery" is not rechargeable. For secondary batteries of the present invention, a battery anode is designated as the positive electrode during discharge, and as the negative electrode during charge.

As used herein, the terms "silver" or "silver material" refer to any silver compound such as Ag, AgO, $Ag_2O$, $Ag_2O_3$, AgOH, $Ag(OH)_2$, $Ag(OH)_3$, AgOOH, AgONa, AgOK, AgOLi, AgORb, AgOONa, AgOOK, AgOOLi, AgOORb, $AgCuO_2$, $AgFeO_2$, $AgMnO_2$, $Ag_2CuMnO_4$, any hydrate thereof, or any combination thereof. Note that 'hydrates' of silver include hydroxides of silver. Because it is believed that the coordination sphere surrounding a silver atom is dynamic during charging and discharging of the cell wherein the silver serves as a cathode, or when the oxidation state of the silver atom is in a state of flux, it is intended that the term 'silver' or 'silver material' encompass any of these silver oxides and hydrates (e.g., hydroxides). Terms 'silver' or 'silver material' also includes any of the above-mentioned species that are doped and/or coated with dopants and/or coatings that enhance one or more properties of the silver. Exemplary dopants and coatings are provided below. In some examples, silver or silver material includes a silver oxide further comprising a first row transition metal dopant or coating. For example, silver includes silver-copper-oxide, silver-iron-oxide, silver-manganese-oxide (e.g., $AgMnO_2$), silver-chromium-oxide, silver-scandium-oxide, silver-cobalt-oxide, silver-titanium-oxide, silver-vanadium-oxide, hydrates thereof, or any combination thereof. Note that the term "oxide" used herein does not, in each instance, describe the number of oxygen atoms present in the silver or silver material. One generic formula for silver oxide is $AgO_v(OH)_y(H_2O)_z$, wherein v, y, and z are real numbers or zero, and at least one of v, y, or z is greater than zero. For example, a silver oxide may have a chemical formula of AgO, $Ag_2O_3$, or a combination thereof. Furthermore, silver can comprise a bulk material or silver can comprise a powder having any suitable mean particle diameter.

As used herein, "iron oxide" refers to any oxide or hydroxide of iron, e.g., FeO, $Fe_2O_3$, $Fe_3O_4$, or any combination thereof.

As used herein, "indium oxide" refers to any oxide or hydroxide of indium, e.g., $In_2O_3$.

As used herein, the terms "divalent silver oxide" and "AgO" are used interchangeably.

As used herein, the term "alkaline battery" refers to a primary battery or a secondary battery, wherein the primary or secondary battery comprises an alkaline electrolyte.

As used herein, a "dopant" or "doping agent" refers to a chemical compound that is added to a substance in low concentrations in order to alter the optical/electrical properties of the semiconductor. For example, a dopant may be added to the powder active material of a cathode to improve its electronic properties (e.g., reduce its impedance and/or resistivity). In other examples, doping occurs when one or more atoms of a crystal lattice of a bulk material is substituted with one or more atoms of a dopant.

As used herein, an "electrolyte" refers to a substance that behaves as an electrically conductive medium. For example, the electrolyte facilitates the mobilization of electrons and cations in the cell. Electrolytes include mixtures of materials such as aqueous solutions of alkaline agents. Some electrolytes also comprise additives such as buffers. For example, an electrolyte comprises a buffer comprising a borate or a phosphate. Exemplary electrolytes include, without limitation, aqueous KOH, aqueous NaOH, or the liquid mixture of KOH in a polymer.

As used herein, "alkaline agent" refers to a base or ionic salt of an alkali metal (e.g., an aqueous hydroxide of an alkali metal). Furthermore, an alkaline agent forms hydroxide ions when dissolved in water or other polar solvents. Exemplary alkaline electrolytes include without limitation LiOH, NaOH, KOH, CsOH, RbOH, or combinations thereof. Electrolytes can optionally include other salts to modify the total ionic strength of the electrolyte, for example KF or $Ca(OH)_2$.

A "cycle" or "charge cycle" refers to a consecutive charge and discharge of a cell or a consecutive discharge and charge of a cell, either of which includes the duration between the consecutive charge and discharge or the duration between the consecutive discharge and charge. For example, a cell undergoes one cycle when, freshly prepared, it is discharged to about 100% of its DOD and re-charged to about 100% of its state of charge (SOC). In another example, a freshly prepared cell undergoes 2 cycles when the cell is:

1) Cycle 1: discharged to about 100% of its DOD and re-charged to about 100% SOC; followed by 2) Cycle 2: a second discharge to about 100% of its DOD and re-charged to about 100% SOC.

It is noted that this process may be repeated to subject a cell to as many cycles as is desired or practical.

For convenience, the polymer name "polytetrafluoroethylene" and its corresponding initials "PTFE" are used interchangeably as adjectives to distinguish polymers, solutions for preparing polymers, and polymer coatings. Use of these names and initials in no way implies the absence of other constituents. These adjectives also encompass substituted and co-polymerized polymers. A substituted polymer denotes one for which a substituent group, a methyl group, for example, replaces a hydrogen on the polymer backbone.

As used herein, "Ah" refers to Ampere (Amp) Hour and is a scientific unit for the capacity of a battery or electrochemical cell. A derivative unit, "mAh" represents a milliamp hour and is $\frac{1}{1000}$ of an Ah.

As used herein, "maximum voltage" or "rated voltage" refers to the maximum voltage an electrochemical cell can be charged without interfering with the cell's intended utility. For example, in several zinc-silver electrochemical cells that are useful in portable electronic devices, the maximum voltage is less than about 2.3 V, or about 2.0 V. In other batteries, such as lithium ion batteries that are useful in portable electronic devices, the maximum voltage is less than about 15.0 V (e.g., less than about 13.0 V, or about 12.6 V or less). The maximum voltage for a battery can vary depending on the number of charge cycles constituting the battery's useful life, the shelf-life of the battery, the power demands of the battery, the configuration of the electrodes in the battery, and the amount of active materials used in the battery.

As used herein, an "anode" is an electrode through which (positive) electric current flows into a polarized electrical device. In a battery or galvanic cell, the anode is the negative electrode from which electrons flow during the discharging phase in the battery. The anode is also the electrode that undergoes chemical oxidation during the discharging phase. However, in secondary, or rechargeable, cells, the anode is the electrode that undergoes chemical reduction during the cell's charging phase. Anodes are formed from electrically conductive or semiconductive materials, e.g., metals, metal oxides, metal alloys, metal composites, semiconductors, or the like. Common anode materials include Si, Sn, Al, Ti, Mg, Fe, Bi, Zn, Sb, Ni, Pb, Li, Zr, Hg, Cd, Cu, $LiC_6$, mischmetals, alloys thereof, oxides thereof, or composites thereof. Anode materials such as zinc may even be sintered.

Anodes may have many configurations. For example, an anode may be configured from a conductive mesh or grid that is coated with one or more anode materials. In another example, an anode may be a solid sheet or bar of anode material.

As used herein, a "cathode" is an electrode from which (positive) electric current flows out of a polarized electrical device. In a battery or galvanic cell, the cathode is the positive electrode into which electrons flow during the discharging phase in the battery. The cathode is also the electrode that undergoes chemical reduction during the discharging phase. However, in secondary or rechargeable cells, the cathode is the electrode that undergoes chemical oxidation during the cell's charging phase. Cathodes are formed from electrically conductive or semiconductive materials, e.g., metals, metal oxides, metal alloys, metal composites, semiconductors, or the like. Common cathode materials include Ag, AgO, $Ag_2O_3$, $Ag_2O$, HgO, $Hg_2O$, CuO, CdO, NiOOH, $Pb_2O_4$, $PbO_2$, $LiFePO_4$, $Li_3V_2(PO_4)_3$, $V_6O_{13}$, $V_2O_5$, $Fe_3O_4$, $Fe_2O_3$, $MnO_2$, $LiCoO_2$, $LiNiO_2$, $LiMn_2O_4$, or composites thereof. Cathode materials such as Ag, AgO, $Ag_2O_3$ may even be sintered.

Cathodes may also have many configurations. For example, a cathode may be configured from a conductive mesh that is coated with one or more cathode materials. In another example, a cathode may be a solid sheet or bar of cathode material.

As used herein, the term "Coulombic efficacy" refers to the number of Coulombs removed from a battery cell on discharge divided by the number of Coulombs that are added into the cell on charge.

As used herein, the term "electronic device" is any device that is powered by electricity. For example, and electronic device can include a portable computer, a portable music player, a cellular phone, a portable video player, or any device that combines the operational features thereof.

As used herein, the term "cycle life" is the maximum number of times a secondary battery can be cycled while retaining a capacity useful for the battery's intended use (e.g., the number of times a cell may be cycled until the cell's 100% SOC, i.e., its actual capacity, is about 90% or less of its rated capacity (e.g., less than 85% of its rated capacity, about 90% of its rated capacity, or about 80% of its rated capacity). In some instances, 'cycle life' is the number of times a secondary battery or cell can be cycled until the cell's 100% SOC is at least about 60 percent of its rated capacity (e.g., at least about 70 percent of its rated capacity, at least about 80 percent of its rated capacity, at least 90 percent of its rated capacity, at least 95 percent of its rated capacity, about 90% of its rated capacity, or about 80% of its rated capacity).

As used herein, the symbol "M" denotes molar concentration.

Batteries and battery electrodes are denoted with respect to the active materials in the fully-charged state. For example, a zinc-silver battery comprises an anode comprising zinc and a cathode comprising a silver powder (e.g., $Ag_2O_3$). Nonetheless, more than one species is present at a battery electrode under most conditions. For example, a zinc electrode generally comprises zinc metal and zinc oxide (except when fully charged), and a silver powder electrode usually comprises AgO, $Ag_2O_3$ and/or $Ag_2O$ and silver metal (except when fully discharged).

As used herein, the term "oxide" applied to alkaline batteries and alkaline battery electrodes encompasses corresponding "hydroxide" species, which are typically present, at least under some conditions.

As used herein, the term, "powder" refers to a dry, bulk solid composed of a plurality of fine particles that may flow freely when shaken or tilted.

As used herein, the term, "mean diameter" or "mean particle diameter" refers to the diameter of a sphere that has the same volume/surface area ratio as a particle of interest.

As used herein, the terms "substantially stable" or "substantially inert" refer to a compound or component that remains substantially chemically unchanged in the presence of an alkaline electrolyte (e.g., potassium hydroxide) and/or in the presence of an oxidizing agent (e.g., silver ions present in the cathode or dissolved in the electrolyte).

As used herein, "charge profile" refers to a graph of an electrochemical cell's voltage or capacity with time. A charge profile can be superimposed on other graphs such as those including data points such as charge cycles or the like.

As used herein, "resistivity" or "impedance" refers to the internal resistance of a cathode in an electrochemical cell. This property is typically expressed in units of Ohms or micro-Ohms.

As used herein, the terms "first" and/or "second" do not refer to order or denote relative positions in space or time, but these terms are used to distinguish between two different elements or components. For example, a first separator does not necessarily proceed a second separator in time or space; however, the first separator is not the second separator and vice versa. Although it is possible for a first separator to precede a second separator in space or time, it is equally possible that a second separator precedes a first separator in space or time.

As used herein, the term "nanometer" and "nm" are used interchangeably and refer to a unit of measure equaling $1 \times 10^{-9}$ meters.

As used herein, the terms "analogous cathode" refer to a cathode of a pair of cathodes wherein the cathodes of the pair are substantially identical to each other (e.g., use substantially the same amount of cathode materials (e.g., silver, binder, dopants, coatings, or any combination thereof); and/or using substantially the same methods of manufacturing) whose most significant difference is that one cathode of the pair is substantially free of stabilizing agent.

As used herein, the term "Ultramarine" refers to a blue pigment consisting primarily of a double silicate of aluminum and sodium with some sulfides or sulfates, and occurring in nature as a proximate component of lapis lazuli. The pigment color code is P. Blue 29 77007. Ultramarine is one of the most complex mineral pigments, a complex sulfur-containing sodio-silicate ($Na_{8-10}Al_6Si_6O_{24}S_{2-4}$), essentially a mineralized limestone containing a blue cubic mineral called lazurite (the major component in lapis lazuli). Some chloride is often present in the crystal lattice as well. The blue color of the pigment is due to the $S^{3-}$ radical anion, which contains an unpaired electron. 'Ultramarine' also refers to mixed aluminum silicates such as those prepared in a laboratory setting.

As used herein, the term "cathode active material" refers to a composition that includes silver, as described above (e.g., doped silver, coated silver, silver that is doped or coated, or any combination thereof), and one or more stabilizing agents.

As used herein, the terms "battery capacity" or "capacity" refer to the mathematical product of a battery's discharge current and the time (in hours) during which the current is discharged.

As used herein, the terms "aggregate capacity" or "aggregate battery capacity" refers to the sum of a battery's capacities, i.e., the sum of the individual products of discharge current and the time during which the current is discharged, after being discharged to about 100 percent depth of discharge (e.g., more than 97.5% depth of discharge, or more than 99% depth of discharge) over a course of one or more charge cycles.

As used herein, "depth of discharge" and "DOD" are used interchangeably to refer to the measure of how much energy has been withdrawn from a battery or cell, often expressed as a percentage of capacity, e.g., rated capacity. For example, a 100 Ah battery from which 30 Ah has been withdrawn has undergone a 30% depth of discharge (DOD).

As used herein, "state of charge" and "SOC" and used interchangeably to refer to the available capacity remaining in a battery, expressed as a percentage of the cell or battery's rated capacity.

II. Cathodes of the Present Invention

One aspect of the present invention provides a cathode for use in a rechargeable battery comprising a cathode active material comprising a stabilizing agent comprising a powder having a mean particle diameter of about 250 nm or less (e.g., about 100 nm or less); and silver, wherein the stabilizing agent is present in an amount sufficient to impart the cathode with a Coulombic efficiency of greater than about 90% (e.g., greater than about 95% or greater than about 98%).

In some embodiments, the cathode active material comprises silver, and the silver comprises Ag, AgO, $Ag_2O$, $Ag_2O_3$, AgOH, $Ag(OH)_2$, $Ag(OH)_3$, AgOOH, AgONa, AgOK, AgOLi, AgORb, AgOONa, AgOOK, AgOOLi, AgO-ORb, $AgCuO_2$, $AgFeO_2$, $AgMnO_2$, $Ag_2CuMnO_4$, any hydrate thereof, or any combination thereof. In other embodiments, the silver further comprises Pb, B, Al, Ga, Zn, Ni, Pd, In, Fe, or any combination thereof. For example, the silver is doped with a first dopant comprising Pb, B, Al, Ga, Zn, Ni, Pd, In, Fe, or any combination thereof. In another example, the silver is doped with a first dopant comprising Ga. In alternative examples, silver is coated with a coating agent comprising Pb, B, Al, Ga, Zn, Ni, Pd, In, Fe, or any combination thereof. In some instances, the silver is coated with a coating agent comprising Pb. And, in other examples, the silver is doped with a first dopant comprising Ga, and the silver is coated with a coating agent comprising Pb.

In some embodiments, the silver of the cathode active material comprises a powder or a bulk material (e.g., a silver foil, silver pellets, a combination thereof, or the like).

In some embodiments, the stabilizing agent comprises a powder comprising a p-type semiconductor, an n-type semiconductor, or any combination thereof. For example, the stabilizing agent comprises a powder comprising ZnO, $SiO_2$, $ZrO_2$, $TiO_2$, $Al_2O_3$, MgO, SiC, $In_2O_3$, $Ho_2O_3$, $ZnTiO_3$, $Bi_2O_3$, $LiAlO_2$, $BaTiO_3$, $Li_{4-x}Ca_xSiO_4$, $Li_{4-x}Mg_xSiO_4$, $Bi_2O_3$, $Yb_2O_3$, $MnO_2$, Ultramarine, or any combination thereof, wherein x is 1-4. In alternative examples, the stabilizing agent comprises a powder comprising ZnO. And, in some examples, the ZnO is doped with a second dopant comprising $Al_2O_3$, iron oxide, indium oxide, or any combination thereof. In some instances, the ZnO is doped with a second dopant comprising $Al_2O_3$. In other examples, the stabilizing agent comprises a powder comprising $ZrO_2$. And, in some examples, the stabilizing agent comprises a powder comprising $SiO_2$. In other examples, the $SiO_2$ is doped with $Al_2O_3$ (e.g., from about 1 wt % to about 1-wt % of $Al_2O_3$). In some examples, the stabilizing agent comprises a powder, and the powder comprises a plurality of particles comprising $SiO_2$, $ZrO_2$, and ZnO. In other examples, the stabilizing agent comprises a powder comprising $SiO_2$ particles, $ZrO_2$ particles, and ZnO particles. In some instances, the ZnO particles are doped with a second dopant comprising $Al_2O_3$. In other instances, the ZnO particles comprise from about 1 wt % to about 10 wt % of $Al_2O_3$ by weight of the ZnO particles.

In some embodiments, the cathode active material comprises about 7 wt % or less (e.g., about 5 wt % or less, about 2 wt % or less, about 1 wt % or less, about 0.5 wt % or less, or about 0.2 wt % or less) of the stabilizing agent. For example, the cathode active material comprises from about 0.005 wt % to about 0.5 wt % (e.g., from about 0.01 wt % to about 0.3 wt % or from about 0.01 wt % to about 0.2 wt %) of the stabilizing agent.

In other embodiments, the cathode further comprises a binder. Binders suited for use in cathodes of the present invention may comprise any material that can sequester silver powder particles and are substantially inert in the presence of strong alkaline solutions and silver compounds (e.g., AgO or the like). In some examples, the cathode comprises a binder comprising PTFE. In other examples, the binder comprises PVDF.

In some embodiments, the cathode active material comprises a powder that comprises a plurality of particles comprising silver and a plurality of particles comprising a stabilizing agent, wherein at least one particle of silver is associated with at least one particle of a stabilizing agent, the plurality of particles of the stabilizing agent have a mean particle diameter of about 250 nm or less (e.g., about 100 nm or less), and the stabilizing agent is present in an amount sufficient to impart the cathode with a Coulombic efficacy of greater than about 90% (e.g., greater than about 95% or greater than about 98%).

Another aspect of the present invention provides a cathode for use in a rechargeable battery comprising a cathode active material comprising a stabilizing agent comprising a powder having a mean particle diameter of 100 nm or less; and silver, wherein the stabilizing agent is present in an amount sufficient to impart the cathode with a Coulombic efficiency that is at least 10% higher than an analogous cathode whose only significant difference is the absence of a stabilizing agent.

Another aspect of the present invention provides a cathode for use in a rechargeable battery comprising a cathode material, and the cathode material comprises a powder. The powder comprises a plurality of particles comprising silver and a plurality of particles having a mean particle diameter of about 250 nm or less (e.g., about 100 nm or less) comprising a stabilizing agent, wherein at least one particle of silver is associated with at least one particle of a stabilizing agent, wherein the stabilizing agent is present in an amount sufficient to impart the cathode with a Coulombic efficiency that is at least 10% higher than an analogous cathode whose only significant difference is the absence of a stabilizing agent.

Silver is associated with the at least one particle of stabilizing agent when that particle of stabilizing agent is completely embedded in silver, partially embedded in the silver, contacting a surface of an silver particle, or almost contacting a surface of a silver particle (e.g., within 10 nm of an AgO surface), whether the silver comprises a powder or a bulk material.

Cathodes of the present invention can include any suitable stabilizing agent so long as the stabilizing agent is in the form of a powder that comprises particles having a mean diameter of about 250 nm or less (e.g., about 100 nm or less). For instance, the stabilizing agent may comprises a p-type semiconductor, an n-type semiconductor, or a combination thereof. Or, the stabilizing agent comprises a plurality of particles comprising ZnO, $SiO_2$, $ZrO_2$, $TiO_2$, $Al_2O_3$, MgO, SiC, $In_2O_3$, $Ho_2O_3$, $ZnTiO_3$, $Bi_2O_3$, $LiAlO_2$, $BaTiO_3$, $Li_{4-x}Mg_xSiO_4$, $Bi_2O_3$, $Yb_2O_3$, $MnO_2$, Ultramarine, or any combination thereof. Also, the stabilizing agent may be present in any suitable amount. For instance, the stabilizing agent is present in an amount of about 7 wt % or less (e.g., about 5 wt % or less, about 1.5 wt % or less, or about 0.5 wt % or less (e.g., about 0.45 wt % or less, about 0.30 wt % or less, about 0.20 wt % or less, or about 0.15 wt % or less)) by weight of the cathode material. In other instances, the stabilizing agent is present in an amount of from about 0.01 wt % to about 0.2 wt % by weight of the cathode material.

The particles that comprise the stabilizing agent may be further modified to improve one or more of their chemical, electrical, or physical properties. For example, the stabilizing agent particles may be doped and/or coated with any suitable additive that does not substantially impair the ability of the stabilizing agent to associate with Silver. Also, the stabilizing agent can comprise any suitable combination of n-type and/or p-type semiconductor particles.

In several embodiments, the stabilizing agent comprises ZnO. For example, the stabilizing agent comprises ZnO that is doped with $Al_2O_3$. In other embodiments, the stabilizing agent comprises $ZrO_2$. In still other embodiments, the stabilizing agent comprises $SiO_2$.

In several embodiments, the stabilizing agent comprises a plurality of particles and each of the particles comprises $SiO_2$, $ZrO_2$, or ZnO (e.g., ZnO that is doped with $Al_2O_3$). In some instances, the stabilizing agent comprises a plurality of particles comprising a combination of $SiO_2$ particles, $ZrO_2$ particles, and ZnO particles. In other instances, the ZnO particles are doped with $Al_2O_3$. For example, the ZnO particles are doped with from about 1 wt % to about 10 wt % of $Al_2O_3$ by weight of the doped ZnO particles. In other examples, the $SiO_2$ is doped with $Al_2O_3$ (e.g., from about 1 wt % to about 1-wt % of $Al_2O_3$).

Also, cathodes of the present invention can include silver that is doped or coated. For example, the silver is doped with a doping agent comprising Pb, B, Al, Ga, Zn, Ni, Pd, In, Fe, or any combination thereof. Or, the silver is coated with a coating agent comprising Pb, B, Al, Ga, Zn, Ni, Pd, In, Fe, or any combination thereof.

Cathodes of the present invention can further include optional additives such as a colorant, a current collector, or the like. For example, a cathode material may comprises a binder such as PTFE.

Another aspect of the present invention provides a cathode for use in a rechargeable battery comprising a cathode material, and the cathode material comprises a powder. The powder comprises particles comprising silver that is associated with a first stabilizing agent (e.g., ZnO or ZnO doped with $Al_2O_3$), particles comprising silver that is associated with a second stabilizing agent (e.g., $ZrO_2$), and particles comprising silver that is associated with a third stabilizing agent (e.g., $SiO_2$). Any of the silver (e.g., doped silver and/or coated silver), described above, is useful in this aspect of the present invention.

III. Rechargeable Batteries of the Present Invention

Another aspect of the present invention provides a rechargeable battery comprising a cathode comprising a cathode active material comprising silver and a stabilizing agent; an anode comprising zinc; and an electrolyte, wherein the stabilizing agent comprises a powder having a mean particle diameter of about 250 nm or less (e.g., about 100 nm or less), the silver associates with one or more particles of the stabilizing agent, and the stabilizing agent is present in an amount sufficient to impart the cathode with a Coulombic efficiency of greater than about 90% (e.g., greater than about 95% or greater than about 98%).

In some embodiments, the silver comprises Ag, AgO, $Ag_2O$, $Ag_2O_3$, AgOH, $Ag(OH)_2$, $Ag(OH)_3$, AgOOH, AgONa, AgOK, AgOLi, AgORb, AgOONa, AgOOK, AgOOLi, AgOORb, $AgCuO_2$, $AgFeO_2$, $AgMnO_2$, $Ag_2CuMnO_4$, any hydrate thereof, or any combination thereof. In other embodiments, the silver further comprises Pb, B, Al, Ga, Zn, Ni, Pd, In, Fe, or any combination thereof. For example, the silver is doped with a first dopant comprising Pb, B, Al, Ga, Zn, Ni, Pd, In, Fe, or any combination thereof. In other examples, the silver is coated with a coating agent comprising Pb, B, Al, Ga, Zn, Ni, Pd, In, Fe, or any combination thereof. For instance, the silver is coated with a coating agent comprising Pb. In some instances, the silver is coated with a coating agent comprising Pb, and the silver is doped with a first dopant comprising Ga.

In some embodiments, the stabilizing agent comprises a powder comprising a p-type semiconductor, an n-type semiconductor, or any combination thereof. For example, the stabilizing agent comprises a powder comprising ZnO, $SiO_2$, $ZrO_2$, $TiO_2$, $Al_2O_3$, MgO, SiC, $In_2O_3$, $Ho_2O_3$, $ZnTiO_3$, $Bi_2O_3$, $LiAlO_2$, $BaTiO_3$, $Li_{4-x}Ca_xSiO_4$, $Li_{4-x}Mg_xSiO_4$, $Bi_2O_3$, $Yb_2O_3$, $MnO_2$, Ultramarine, or any combination thereof, wherein x is 1-4. In alternative examples, the stabilizing agent comprises a powder comprising ZnO. And, in some examples, the ZnO is doped with a second dopant comprising $Al_2O_3$, iron oxide, indium oxide, or any combination thereof. In some instances, the ZnO is doped with a second dopant comprising $Al_2O_3$. In other examples, the stabilizing agent comprises a powder comprising $ZrO_2$. And, in some examples, the stabilizing agent comprises a powder comprising $SiO_2$. In other examples, the $SiO_2$ is doped with $Al_2O_3$ (e.g., from about 1 wt % to about 1-wt % of $Al_2O_3$). In some examples, the stabilizing agent comprises a powder, and the powder comprises a plurality of particles comprising $SiO_2$, $ZrO_2$, and ZnO. In other examples, the stabilizing agent comprises a powder comprising $SiO_2$ particles, $ZrO_2$ particles, and ZnO particles. In some instances, the ZnO particles are doped with a second dopant comprising $Al_2O_3$. In other instances, the ZnO particles comprise from about 1 wt % to about 10 wt % of $Al_2O_3$ by weight of the ZnO particles.

In other embodiments, the cathode active material comprises about 7 wt % or less (e.g., about 0.5 wt % or less or about 0.2 wt % or less) of the stabilizing agent. For example, the cathode active material comprises from about 0.01 wt % to about 0.2 wt % of the stabilizing agent.

Another aspect of the present invention provides a rechargeable battery comprising a cathode comprising a cathode material comprising a powder; an anode comprising zinc; and an electrolyte, wherein the powder comprises particles of silver and particles of stabilizing agent having a mean particle diameter of about 250 nm or less (e.g., about 100 nm or less), at least one particle of silver is associated with at least one particle of stabilizing agent, and the stabilizing agent is present in an amount sufficient to impart the cathode with an activity of greater than about 90% (e.g., greater than about 95% or greater than about 98%).

Another aspect of the present invention provides an electrochemical cell comprising a cathode comprising a cathode material comprising a powder, wherein the powder comprises a plurality of particles comprising silver that are associated with at least one particle of a stabilizing agent, and the stabilizing agent comprises a plurality of particles having a mean particle diameter of about 250 nm or less (e.g., about 100 nm or less); an anode comprising Zn; and an electrolyte, wherein the cathode of the electrochemical cell has sufficient stabilizing agent such that the cell retains a substantially constant capacity after more than about 70 charge cycles.

In some embodiments, the rechargeable battery comprising a cathode comprising a cathode active material comprising silver and a stabilizing agent; an anode comprising zinc; and an electrolyte, wherein the stabilizing agent comprises a powder having a mean particle diameter of about 250 nm or less, and the rechargeable battery provides a battery capacity of at least about 140 mAh/g of silver per discharge for a period of at least about 100 consecutive charge cycles.

In some embodiments, the battery provides a battery capacity of at least about 140 mAh/g of silver per discharge for a period of at least about 150 consecutive charge cycles. In other embodiments, the battery provides a battery capacity of more than about 140 mAh/g of silver per discharge for a period of at least about 100 consecutive charge cycles. In some embodiments, the battery provides at least about 14 Ah/g of silver aggregate capacity over a period of no more than about 1000 consecutive charge cycles. And, in other embodiments, the battery provides at least about 200 mAh/g of silver per discharge for a period of at least about 150 (e.g., about 175 or more) consecutive charge cycles.

In other embodiments, the rechargeable battery comprising a cathode comprising a cathode active material comprising silver and a stabilizing agent; an anode comprising zinc; and an electrolyte, wherein the stabilizing agent comprises a powder having a mean particle diameter of about 250 nm or less (e.g., about 100 nm or less), and the rechargeable battery provides at least about 12 Ah of aggregate battery capacity per gram of silver over a period of no more than about 1000 consecutive charge cycles.

In some embodiments, the rechargeable battery provides a battery capacity of at least about 140 mAh per gram of silver per discharge for a period of at least about 150 consecutive charge cycles. For instance, the rechargeable battery provides a battery capacity of more than about 140 mAh per gram of silver per discharge for a period of at least about 100 consecutive charge cycles.

Another aspect of the present invention provides a rechargeable battery comprising a cathode comprising a cathode active material comprising silver and a stabilizing agent; an anode comprising zinc; and an electrolyte, wherein the stabilizing agent comprises a powder having a mean particle diameter of about 250 nm or less (e.g., about 100 nm or less), and the rechargeable battery provides an aggregate capacity of at least about 12 Ah per gram of silver over a period of no more than about 1000 consecutive charge cycles.

Any of the cathodes and cathode materials described above are suitable for use in a rechargeable battery of the present invention.

Furthermore, rechargeable batteries of the present invention may comprise any suitable electrolyte. For instance, the electrolyte comprises an alkaline agent having any suitable concentration. In one example, the alkaline agent comprises LiOH, NaOH, KOH, CsOH, RbOH, or any combination thereof. In other examples, the alkaline agent comprises a combination of NaOH and KOH.

IV. Methods of the Present Invention

The present invention also provides methods of producing a cathode described above.

In one aspect of the present invention, the method of producing a cathode comprises providing silver; providing a stabilizing agent comprising a powder having a mean particle diameter of no more than about 250 nm (e.g., no more than about 100 nm); and associating the silver material with one or more particles of the stabilizing agent.

In some methods, the silver comprises Ag, AgO, $Ag_2O$, $Ag_2O_3$, AgOH, $Ag(OH)_2$, $Ag(OH)_3$, AgOOH, AgONa, AgOK, AgOLi, AgORb, AgOONa, AgOOK, AgOOLi, AgOORb, $AgCuO_2$, $AgFeO_2$, $AgMnO_2$, $Ag_2CuMnO_4$, any hydrate thereof, or any combination thereof. In other methods, the silver further comprises Pb, B, Al, Ga, Zn, Ni, Pd, In, Fe, or any combination thereof. For example, the silver is doped with a first dopant comprising Pb, B, Al, Ga, Zn, Ni, Pd, In, Fe, or any combination thereof. In some instances, the silver is doped with a rust dopant comprising Ga. In other examples, the silver is coated with a coating agent comprising Pb, B, Al, Ga, Zn, Ni, Pd, In, Fe, or any combination thereof. For instance, the silver is coated with a coating agent comprising Pb. In some instances, the silver is coated with a coating agent comprising Pb, and the silver is doped with a first dopant comprising Ga.

In other methods, the stabilizing agent comprises a powder comprising ZnO, $SiO_2$, $ZrO_2$, $TiO_2$, $Al_2O_3$, MgO, SIC, $In_2O_3$, $Ho_2O_3$, $ZnTiO_3$, $Bi_2O_3$, $LiAlO_2$, $BaTiO_3$, $Li_{4-x}Ca_xSiO_4$, $Li_{4-x}$ Mg$_x$SiO$_4$, Bi$_2$O$_3$, Yb$_2$O$_3$, MnO$_2$, Ultramarine, or any combination thereof, wherein x is 1-4. For example, the stabilizing agent comprises a powder comprising ZnO. In some instances, the ZnO is doped with a second dopant comprising Al$_2$O$_3$, iron oxide, indium oxide, or any combination thereof. For example, the ZnO is doped with a second dopant comprising Al$_2$O$_3$. In other examples, the stabilizing agent comprises a powder comprising ZrO$_2$. And, in some examples, the stabilizing agent comprises a powder comprising SiO$_2$. In other examples, the SiO$_2$ is doped with Al$_2$O$_3$ (e.g., from about 1 wt % to about 1-wt % of Al$_2$O$_3$). In alternative examples, the stabilizing agent comprises a powder, and the powder comprises a plurality of particles comprising SiO$_2$, ZrO$_2$, and ZnO. In some examples, the stabilizing agent comprises a powder comprising SiO$_2$ particles, ZrO$_2$ particles, and ZnO particles. In some instances, the ZnO particles are doped with a second dopant comprising Al$_2$O$_3$. For example, ZnO particles are doped with from about 1 wt % to about 10 wt % of a second dopant comprising Al$_2$O$_3$ by weight of the ZnO particles.

Some methods further comprise providing about 7 wt % or less (e.g., about 0.5 wt % or less) of the stabilizing agent. For example, providing from about 0.01 wt % to about 0.3 wt % (e.g., from about 0.01 wt % to about 0.2 wt %) of the stabilizing agent.

Another aspect of the present invention provides a method of improving the Coulombic efficiency of a silver cathode comprising adding a stabilizing agent to the silver cathode, wherein the stabilizing agent comprises a powder, and the powder has a mean particle diameter of no more than about 250 nm (e.g., no more than about 100 nm).

Some methods further comprise adding about 7 wt % or less of the stabilizing agent by weight of the silver cathode. For example, adding from about 0.01 wt % to about 0.2 wt % of the stabilizing agent.

In some methods, the silver cathode further comprises a binder such as PTFE.

V. Examples

A. Methods of Formulating Exemplary Cathodes

It is noted that the examples provided below are exemplary in nature and do not encompass the entire scope of the present invention. Materials used for the preparation of cathodes of the present invention can, in many cases, include substitutions. For instance, a KOH alkaline solution can be substituted with NaOH, LiOH, CsOH, combinations thereof, or the like. And the oxidizer K$_2$S$_2$O$_8$ and also be substituted with Na$_2$S$_2$O$_8$ or other oxidizing agents. Other substitutions are also possible. For instance, gelatin may be replaced by one or more alternative surfactants. Also, in many instances nanopowders comprising stabilizing agents may be used interchangeably or in any suitable combination.

Materials:

Silver nitrate: A.C.S. grade, DFG

Potassium hydroxide solution: 40% KOH solution, prepared from KOH pellets,

Potassium persulfate, 99+ %, Sigma-Aldrich

Zinc oxide: doped with 6% Al, nanopowder, <50 nm (BET), >97%, Sigma-Aldrich

Zirconium(IV) oxide: nanopowder, <100 nm particle size (BET), Sigma-Aldrich

Silica: nanopowder, <5 nm, Nyacol Nano Technologies Inc.

Example 1

Production of AgO Cathode

A 2000 ml beaker was placed into a hot water bath and an overhead stirring propeller was installed. 116.7 g of AgNO$_3$ and 1000 g of DI water were added to the reaction container and stirred at 400 rpm. 0.11 g gelatin was added. The flask was heated to 55° C.

In a plastic container, 260 g of KOH solution (1.4 g/ml) was mixed with 260 g of DI water to produce a diluted KOH solution. The diluted KOH solution was added to the heated reaction container per precise pump. 198 g of potassium persulfate was added at 65° C. After the addition of the potassium persulfate, the reaction flask was maintained at 65° C. for 50 min.

The stirring was stopped and the AgO particles settled to the bottom of the flask. The water was decanted. The particles were rinsed with DI water, and when the particles settled the water was decanted again. The rinse and decant process was repeated until the ion conductivity of the mixture dropped below 20 micro-Ohms. The slurry was filtered and dried at 60° C. in a vacuum oven.

This process generated ~85 g of AgO (yield>99%).

In a 2 L Erlenmeyer flask, 70 g of dry AgO powder, produced using the method above, was added to 700 g of DI water. The mixture was stirred with an overhead stirrer at a stir speed of 250 rpm. 2.73 g of lead acetate trihydrate was dissolved in 50 g of DI water and added dropwise to the AgO mixture with a MasterFlex pump. Once the addition was completed, the lead solution container was rinsed with 50 g DI water twice and the dropwise addition continued.

60 min after the lead acetate addition, stirring was stopped, the AgO particles settled, and the water was decanted. This rinse and decant procedure was repeated until the ion conductivity measured less than 20 micro-Ohms. The resulting material was filtered and dried at 60° C. in a vacuum oven.

Example 2

Exemplary Cathode Material Including a ZnO—Al$_2$O$_3$ Stabilizing Agent

A 2000 ml beaker was placed into a hot water bath and an overhead stirring propeller was installed. 116.7 g of AgNO$_3$ and 1000 g of DI water were added to the reaction container and stirred at a stir speed of 400 rpm. 12 mg ZnO—Al$_2$O$_3$ was dispersed in 100 g DI water then added. 0.11 g of gelatin was added, and the flask was heated to 55° C.

In a plastic container, 260 g of KOH solution (1.4 g/ml) was mixed with 260 g of DI water to produce a diluted KOH solution. The diluted KOH solution was added to the heated reaction container using a MasterFlex pump. 198 g of potassium persulfate was added at 65° C. After the addition of the potassium persulfate, the reaction flask was maintained at 65° C. for 50 min.

The stirring was stopped and the AgO particles settled to the bottom of the flask. The water was decanted. The particles were rinsed with DI water, and when the particles settled the water was decanted again. The rinse and decant process was repeated until the ion conductivity of the mixture dropped below 20 micro-Ohms. The resulting material was filtered and dried at 60° C. in a vacuum oven.

This process generated ~85 g of AgO (yield>99%).

In a 2 L Erlenmeyer flask, 78 g of the dry AgO powder, produced above, was added to 780 g of DI water. The mixture was stirred with overhead stirrer using a stir speed of 400 rpm.

3.04 g of lead acetate trihydrate was dissolved in 50 g DI water and added dropwise to the AgO mixture with a MasterFlex pump. Once the addition was completed, the lead solution container was rinsed with 50 g DI water twice and the dropwise addition continued.

60 min after the lead acetate addition, stirring was stopped, the AgO particles settled, and the water was decanted. The rinse and decant procedure was repeated until the ion conductivity measured less than 20 micro-Ohms. The resulting material was filtered and dried at 60° C. using a vacuum oven.

Example 3

Exemplary Cathode Material Including a $SiO_2$ Stabilizing Agent

A 2000 ml beaker was placed into a hot water bath and an overhead stirring propeller was installed. 116.7 g of $AgNO_3$ and 1000 g of DI water were added to the reaction container and stirred using a stir speed of 400 rpm. 9 mg of silica was dispersed in 20 g of DI water then added. 0.11 g of gelatin was added. The flask was heated to 55° C.

In a plastic container, 260 g of KOH solution (1.4 g/ml) was mixed with 260 g of DI water to produce a diluted KOH solution. The diluted KOH solution was added to the heated reaction container per MasterFlex pump. 198 g of potassium persulfate was added at 65° C. After the addition of the potassium persulfate, the reaction flask was maintained at 65° C. for 50 min.

The stirring was stopped and the AgO particles settled to the bottom of the flask. The water was decanted. The particles were rinsed with DI water, and when the particles settled the water was decanted again. The rinse and decant process was repeated until the ion conductivity of the mixture dropped below 20 micro-Ohms.

This process generated ~85 g of AgO (yield>99%).

In a 2 L Erlenmeyer flask containing the above AgO slurry, DI water was added until the total weight of the mixture was 935 g. The mixture was stirred with overhead stirrer using a stir speed of 400 rpm. 332 g of lead acetate trihydrate was dissolved in 50 g of DI water and added dropwise to the AgO mixture with a MasterFlex pump. Once the addition was completed, the lead solution container was rinsed with 50 g DI water twice and the dropwise addition continued.

60 min after the lead acetate addition, stirring was stopped, the AgO particles settled, and the water was decanted. This rinse and decant procedure was repeated until the ion conductivity measured less than 20 micro-Ohms. The resulting material was filtered and dried the material at 60° C. using a vacuum oven.

Example 4

Exemplary Cathode Material Including a $ZrO_2$ Stabilizing Agent

A 2000 ml beaker was placed into a hot water bath and an overhead stirring propeller was installed. 116.7 g of $AgNO_3$ and 1000 g of DI water were added to the reaction container and stirred using a stir speed of 400 rpm. 95 mg zirconium (IV) oxide was dispersed in 100 g of DI water then added. 0.11 g gelatin was added. The flask was heated to 55° C.

In a plastic container, 260 g of KOH solution (1.4 g/ml) was mixed with 260 g of DI water to produce a diluted KOH solution. The diluted KOH solution was added to the heated reaction container per MasterFlex pump. 198 g of potassium persulfate was added at 65° C. After the addition of the potassium persulfate, the reaction flask was maintained at 65° C. for 50 min.

The stirring was stopped and the AgO particles settled to the bottom of the flask. The water was decanted. The particles were rinsed with DI water, and when the particles settled the water was decanted again. This rinse and decant process was repeated until the ion conductivity of the mixture dropped below 20 micro-Ohms.

This process generated ~85 g of AgO (yield>99%).

In a 2 L Erlenmeyer flask containing the above AgO slurry, DI water was added until the total weight of the mixture was 935 g. The mixture was stirred with an overhead stirrer using a stir speed of 400 rpm. 3.32 g of lead acetate trihydrate was dissolved in 50 g of DI water and added dropwise to the AgO mixture with a MasterFlex pump. Once the addition was completed, the lead solution container was rinsed with 50 g of DI water twice and the dropwise addition continued.

60 min after the lead acetate addition, stirring was stopped, the AgO particles settled, and the water was decanted. The rinse and decant procedure was repeated until the ion conductivity measured less than 20 micro-Ohms. The resulting material was filtered and dried at 60° C. using a vacuum oven.

Example 5

Exemplary Cathode Material Including a Stabilizing Agent Formulated from $SiO_2$, $ZrO_2$, and ZnO Doped with $Al_2O_3$ A 4 L beaker was placed into a hot water bath and an overhead stirring propeller was installed. 233.4 g of $AgNO_3$ and 1200 g of DI water were added to the reaction container and stirred using a stir speed of 450 rpm. 0.2 g of gelatin was added. 26 mg of silica was dispersed in 50 g of DI water, 48 mg ZnO—$Al_2O_3$, and 240 mg of zirconium (IV) oxide (50 nm, Alfa-Aesar) were dispersed in 58 g of DI water then added to the beaker. The beaker was heated to 55° C.

In a plastic container, 520 g of KOH solution (1.4 g/ml) was mixed with 520 g of DI water to produce a diluted KOH solution. The diluted KOH solution was dropped into the heated reaction container per MasterFlex pump. 396 g of potassium persulfate was added at 65° C. After the addition of the potassium persulfate, the reaction flask was maintained at 65° C. for 50 min.

The stirring was stopped and the AgO particles settled to the bottom of the flask. The water was decanted. The particles were rinsed with DI water, and when the particles settled the water was decanted again. This rinse and decant process was repeated until the ion conductivity of the mixture dropped below 20 micro-Ohms.

This process generated ~170 g of AgO (yield>99%).

In a 4 L beaker containing the above AgO slurry, DI water was added until the total weight of the mixture was 1870 g. The mixture was stirred with overhead stirrer using a stir speed of 400 rpm. 6.63 g of lead acetate trihydrate was dissolved in 50 g of DI water and added dropwise to the AgO mixture with a MasterFlex pump. Once the addition was completed, the lead solution container was rinsed with 50 g of DI water twice and the dropwise addition continued.

60 min after the lead acetate addition, stirring was stopped, the AgO particles settled, and the water was decanted. The rinse and decant procedure was repeated until the ion conductivity measured less than 20 micro-Ohms. The resulting material was filtered and dried at 60° C. using a vacuum oven.

Example 6

Exemplary Cathode Material Including a Gallium Doped, Lead Coated Silver Material and Stabilizing Agent Formulated from $SiO_2$, $ZrO_2$, and ZnO Doped with $Al_2O_3$ A 4 L beaker was placed into a hot water bath and an overhead stirring propeller was installed. 233.4 g of $AgNO_3$ and 1200 g of DI water were added to the reaction container and stirred at 450 rpm. 0.15 g of gelatin and 1.53 g gallium hydroxide were added. 32 mg silica was dispersed in 58 g water, 48 mg ZnO—$Al_2O_3$ and 240 mg zirconium (IV) oxide (50 nm, Alfa-Aesar) were dispersed in 61 g DI water then added. The beaker was heated to 55° C.

In a plastic container, 520 g of KOH solution (1.4 g/ml) was mixed with 520 g of DI water to produce a diluted KOH solution. The diluted KOH solution was dropped into the heated reaction container per MasterFlex pump. 396 g of potassium persulfate was added at 65° C. After the addition of the potassium persulfate, the reaction flask was maintained at 65° C. for about 50 min.

The stirring was stopped and the AgO particles settled to the bottom of the flask. The water was decanted. The particles were rinsed with DI water, and when the particles settled the water was decanted again. The rinse and decant process was repeated until the ion conductivity of the mixture dropped below about 20 micro-Ohms.

This process generated about 170 g of Ga doped AgO.

In a 4 L beaker containing the above doped AgO slurry, DI water was added until the total weight of the mixture was 1870 g. The mixture was stirred with overhead stirrer at 400 rpm. 6.63 g of lead acetate trihydrate was dissolved in 50 g DI water and added dropwise to the AgO mixture with a MasterFlex pump. Once the addition was completed, the lead solution container was rinsed with 50 g DI water twice and the dropwise addition continued.

60 min after the lead acetate addition, stirring was stopped, the AgO particles settled, and the water was decanted. The rinse and decant procedure was repeated until the ion conductivity measured less than 20 micro-Ohms. The resulting material was filtered and dried at 60° C. using a vacuum oven.

Example 7

Exemplary Cathode Material Including $AgCuO_2$ and Stabilizing Agent Formulated from $SiO_2$ and $ZrO_2$ In a plastic container, 34.45 g of $AgNO_3$, 48.50 g of Cu$(NO_3)_2 \cdot 2 5H_2O$, and 400 g of DI water were added. 4 mg silica and 41 mg zirconium (IV) oxide (50 nm, Alfa-Aesar) were dispersed in 100 g DI water then added to the container.

A 2 L beaker was placed into a hot water bath and an overhead stirring propeller was installed. 233 g of KOH solution (1.4 g/ml) was mixed with 233 g of DI water to produce a diluted KOH solution, which was stirred at 400 rpm. The beaker was heated to 55° C. The above $AgNO_3$ solution was added. 173.6 g of potassium persulfate was added at 65° C. After the addition of the potassium persulfate, the reaction flask was maintained at 65° C. for 30 min.

The stirring was stopped and the particles settled to the bottom of the flask. The water was decanted. The particles were rinsed with DI water, and when the particles settled the water was decanted again. The rinse and decant process was repeated until the ion conductivity of the mixture dropped below 20 micro-Ohms.

The material was filtered and then dried in a vacuum oven at 60° C. This process generated about 40 g of $AgCuO_2$.

Example 8

Exemplary Cathode Material Including Physical Mixture of Stabilized Silver Oxide Formulated from Particles of AgO—$SiO_2$, AgO—$ZrO_2$, and AgO—ZnO—$Al_2O_3$ The exemplary cathode material of Example No. 8 was prepared by physically mixing 25 g of each cathode material prepared as described above in Example Nos. 2, 3, and 4.

Example 9

Additional Exemplary Cathode Materials

Exemplary cathode materials were generated following the procedures of Example No. 2, wherein the ZnO—$Al_2O_3$ was substituted with the stabilizing agents described in Table 1:

TABLE 1

Summary of formulations of exemplary cathodes of the present invention.

| Stabilizing Agent | Amount by Weight of AgO | Size of Stabilizing Agent (nm) |
|---|---|---|
| ZnO—$Al_2O_3$ | 0.028% | 50 |
| ZnO—$Al_2O_3$ | 0.014% | 50 |
| ZnO—$Al_2O_3$ | 0.03% | 50 |
| ZnO—$Al_2O_3$ | 0.028% | 50 |
| ZnO—$Al_2O_3$ | 0.016% | 50 |
| $ZrO_2$ | 0.112% | 100 |
| $ZrO_2$ | 0.014% | 50 |
| ZnO, $ZrO_2$ | 0.016%, 0.014% | 50, 50 |
| $SiO_2$, ZnO, $ZrO_2$ | 0.01%, 0.028%, 0.014% | 5, 50, 50 |
| $SiO_2$ | 0.01% | 5 |
| SiC | 0.13% | 100 |
| $ZnTiO_3$ | 0.11% | 100 |
| $TiO_2$ | 0.01% | 25 |
| $Bi_2O_3$ | 0.18% | 90-210 |
| $Yb_2O_3$ | 0.17% | 100 |
| $Ho_2O_3$ | 0.03% | 100 |
| $Al_2O_3$ | 0.01% | 50 |
| MgO | 0.01% | 50 |
| Ultramarine | 1.30% | 200 |

B. Characterization of Exemplary Cathodes

Formulations of several exemplary cathodes of the present invention are characterized below in Table 2, along with an AgO cathode that is provided for purposes of comparison.

TABLE 2

Summary of formulations of exemplary cathodes of the present invention.

| Example No. | Stabilizing Agent | Design Particle Ratio (Stabilizing Agent Particles to AgO Particles) | Amount by Weight of AgO | Actual Addition (mg) |
|---|---|---|---|---|
| 1 | None | None | None | None |
| 2 | ZnO—$Al_2O_3$ | ~5 to 1 | 0.014% | 12 |
| 3 | $SiO_2$ | ~1000 to 1 | 0.01% | 9 |
| 4 | $ZrO_2$ | ~5 to 1 | 0.11% | 95 |
| 5 | ZnO—$Al_2O_3$ | ~10 to 1 | 0.028% | 48 |
|  | $SiO_2$ | ~1000 to 1 | 0.01% | 26 |
|  | $ZrO_2$ | ~50 to 1 | 0.014% | 240 |

TABLE 2-continued

Summary of formulations of exemplary cathodes of the present invention.

| Example No. | Stabilizing Agent | Design Particle Ratio (Stabilizing Agent Particles to AgO Particles) | Amount by Weight of AgO | Actual Addition (mg) |
|---|---|---|---|---|
| 6 | ZnO—Al$_2$O$_3$ | ~10 to 1 | 0.028% | 48 |
|   | SiO$_2$ | ~1000 to 1 | 0.01% | 32 |
|   | ZrO$_2$ | ~50 to 1 | 0.014% | 240 |
| 7[a] | SiO$_2$ | N/A | 0.01 | 4 |
|   | ZrO$_2$ | N/A | 0.1 | 41 |
| 8 | ZnO—Al$_2$O$_3$ | N/A | N/A | N/A |
|   | SiO$_2$ | N/A | N/A | N/A |
|   | ZrO$_2$ | N/A | N/A | N/A |

[a]The weight percents of the ingredients of the stabilizing agent provided for Example No. 7 are given in Amount by Weight of AgCuO$_2$.

The physical properties of several of these exemplary cathode materials were tested. The test procedures and results are provided below:

1. Activity

The activity of the exemplary cathode materials described above was measured by titration. Material was crushed and/or grinded with a spatula. If the sample was not completely dry, it was dried in a vacuum oven at 60° C. overnight. 0.100 g of sample was added directly into clean 125 ml flask, and weight was recorded accurately to at least the third decimal place. 10 ml of acetate buffer and 5 ml KI solution (59%) was added to the flask. The flask was swirled to disperse particles. The flask was covered by putting an inverted small plastic cup over its top, and the covered flask was sonicated for 2 hours. 20 ml DI water was added to the flask. The mixture was titrated with Na$_2$S$_2$O$_3$ (exact normality was recorded) until solution turned a pale yellow color. Approximately 1 ml starch indicator was added and the titration continued until the mixture turned a milky whitish-yellow color indicating the endpoint.

Activity Calculation:

$$\text{Activity} = \frac{(\text{Vol. Titrant (ml)}) \times (\text{Normality of Titrant}) \times 12.388}{\text{Mass of AgO(g)}}$$

2. Particle Size Analysis

The particle size of the product was analyzed using a Horiba laser diffractometer (model no. LA-930). Diameters on several population distributions (e.g., 5, 10%, 20%, etc.) were recorded and are provided below in Table 2.

Particle size and shape characterization was also performed using Scanning Electron Microscopy/Energy Dispersive X-ray Analysis (SEM/EDS). An electron microscope with an energy dispersive X-ray spectrometer was used for this analysis. The resulting SEM Micrographs showing images with and without stabilizing agent before and after charge cycling are provided in FIGS. 14A-15B.

3. Resistivity

The resistivity of the cathode material was determined using the following method: 3 grams of sample cathode material was loaded into a press having a 3.88 cm$^2$ area. A force of from 10 to 40 metric tons was applied to the sample cathode material, and resistance was recorded at every 5 metric ton increment between 10 metric tons and 40 metric tons. Note that the resistivity of the sample is the value at infinite force. The resistivities of samples are provided in Table 3, below.

The activities, particle sizes, and resistivities for several examplary cathode materials are provided in Table 3.

TABLE 3

Characterization of several exemplary cathode materials.

| Example No. | Stabilizing Agent | Activity (%) | Resistivity (Ohm × cm) | Particle Size (μm) Distribution | Size |
|---|---|---|---|---|---|
| 1 | None | 95 | 2.2 | 5% | 0.38 |
|   |   |   |   | 10% | 0.45 |
|   |   |   |   | 20% | 0.72 |
|   |   |   |   | 30% | 1.03 |
|   |   |   |   | 40% | 1.26 |
|   |   |   |   | 50% | 1.52 |
|   |   |   |   | 70% | 2.06 |
|   |   |   |   | 80% | 2.44 |
|   |   |   |   | 90% | 3.01 |
|   |   |   |   | 95% | 3.57 |
| 2[b] | ZnO—Al$_2$O$_3$ | 96 | 3.5 | 5% | 0.37 |
|   |   |   |   | 10% | 0.42 |
|   |   |   |   | 20% | 0.57 |
|   |   |   |   | 30% | 0.84 |
|   |   |   |   | 40% | 1.07 |
|   |   |   |   | 50% | 1.27 |
|   |   |   |   | 70% | 1.71 |
|   |   |   |   | 80% | 2.00 |
|   |   |   |   | 90% | 2.43 |
|   |   |   |   | 95% | 2.82 |
| 3 | SiO$_2$ | 96 | 2.2 | 5% | 0.35 |
|   |   |   |   | 10% | 0.40 |
|   |   |   |   | 20% | 0.50 |
|   |   |   |   | 30% | 0.73 |
|   |   |   |   | 40% | 1.01 |
|   |   |   |   | 50% | 1.22 |
|   |   |   |   | 70% | 1.72 |
|   |   |   |   | 80% | 2.05 |
|   |   |   |   | 90% | 2.55 |
|   |   |   |   | 95% | 3.02 |
| 4 | ZrO$_2$ | 95 | 2.3 | 5% | 0.36 |
|   |   |   |   | 10% | 0.41 |
|   |   |   |   | 20% | 0.54 |
|   |   |   |   | 30% | 0.82 |
|   |   |   |   | 40% | 1.08 |
|   |   |   |   | 50% | 1.32 |
|   |   |   |   | 70% | 1.88 |
|   |   |   |   | 80% | 2.25 |
|   |   |   |   | 90% | 2.86 |
|   |   |   |   | 95% | 3.41 |
| 5 | ZnO—Al$_2$O$_3$ SiO$_2$ ZrO$_2$ | 95 | N/A | 5% | 0.35 |
|   |   |   |   | 10% | 0.40 |
|   |   |   |   | 20% | 0.53 |
|   |   |   |   | 30% | 0.76 |
|   |   |   |   | 40% | 0.99 |
|   |   |   |   | 50% | 1.16 |
|   |   |   |   | 70% | 1.57 |
|   |   |   |   | 80% | 1.81 |
|   |   |   |   | 90% | 2.17 |
|   |   |   |   | 95% | 2.50 |
| 6 | ZnO—Al$_2$O$_3$ SiO$_2$ ZrO$_2$ | 95 | N/A | 5% | 0.40 |
|   |   |   |   | 10% | 0.49 |
|   |   |   |   | 20% | 0.88 |
|   |   |   |   | 30% | 1.22 |
|   |   |   |   | 40% | 1.57 |
|   |   |   |   | 50% | 1.94 |
|   |   |   |   | 70% | 3.01 |
|   |   |   |   | 80% | 3.88 |
|   |   |   |   | 90% | 5.35 |
|   |   |   |   | 95% | 6.78 |
| 7 | N/A | N/A | N/A | 5% | 0.38 |
|   |   |   |   | 10% | 0.43 |
|   |   |   |   | 20% | 0.61 |
|   |   |   |   | 30% | 0.85 |
|   |   |   |   | 40% | 1.04 |
|   |   |   |   | 50% | 1.19 |
|   |   |   |   | 70% | 1.58 |
|   |   |   |   | 80% | 1.80 |
|   |   |   |   | 90% | 2.17 |
|   |   |   |   | 95% | 6.78 |

[b]In Example 2, only 1.65 g of material was used for resistivity testing.

Figure 2:
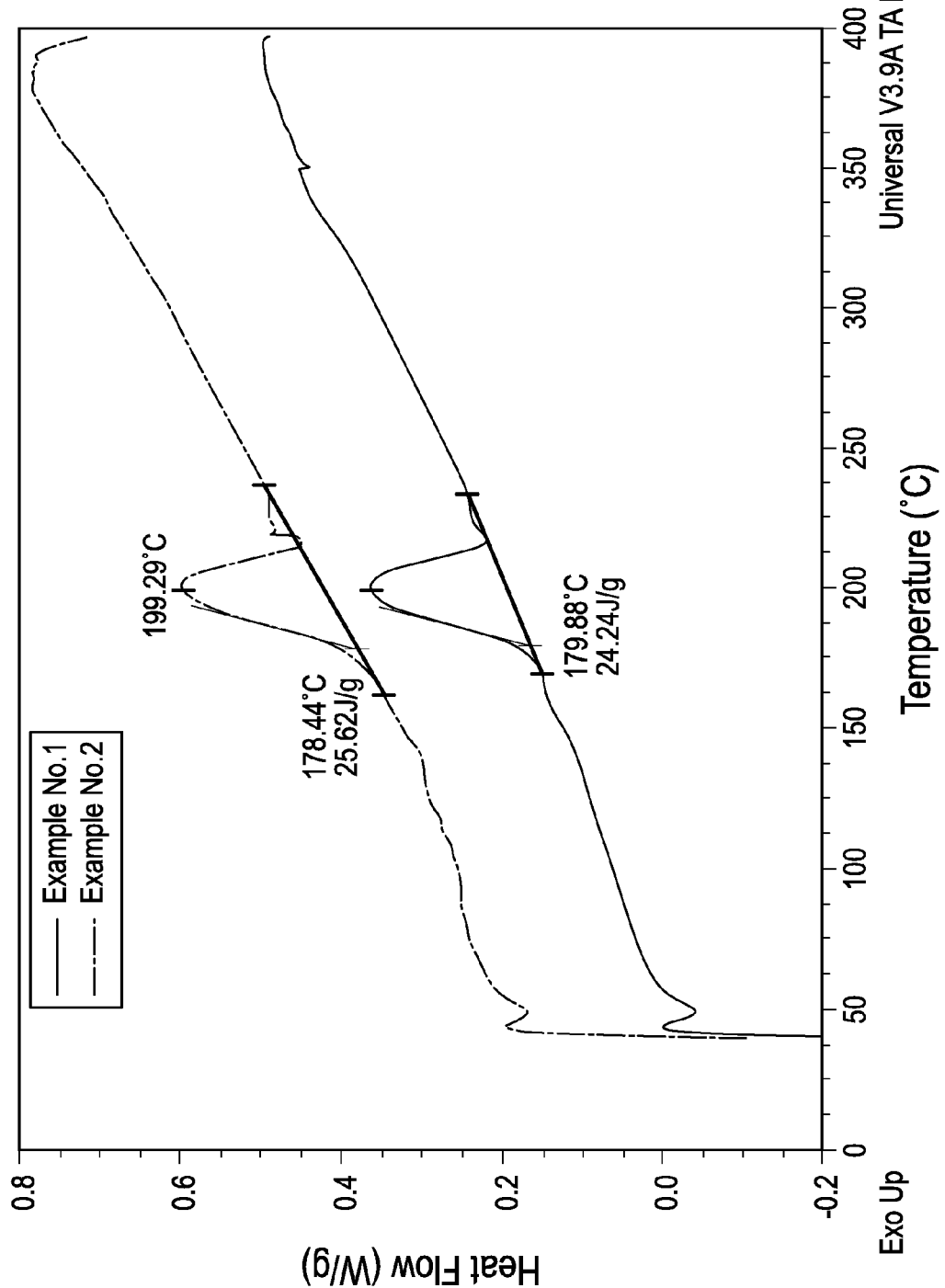
FIG. 2 is a graphical representation of the diffraction scanning calorimetry data recorded for Example Nos. 1 and 2.
Figure 3:
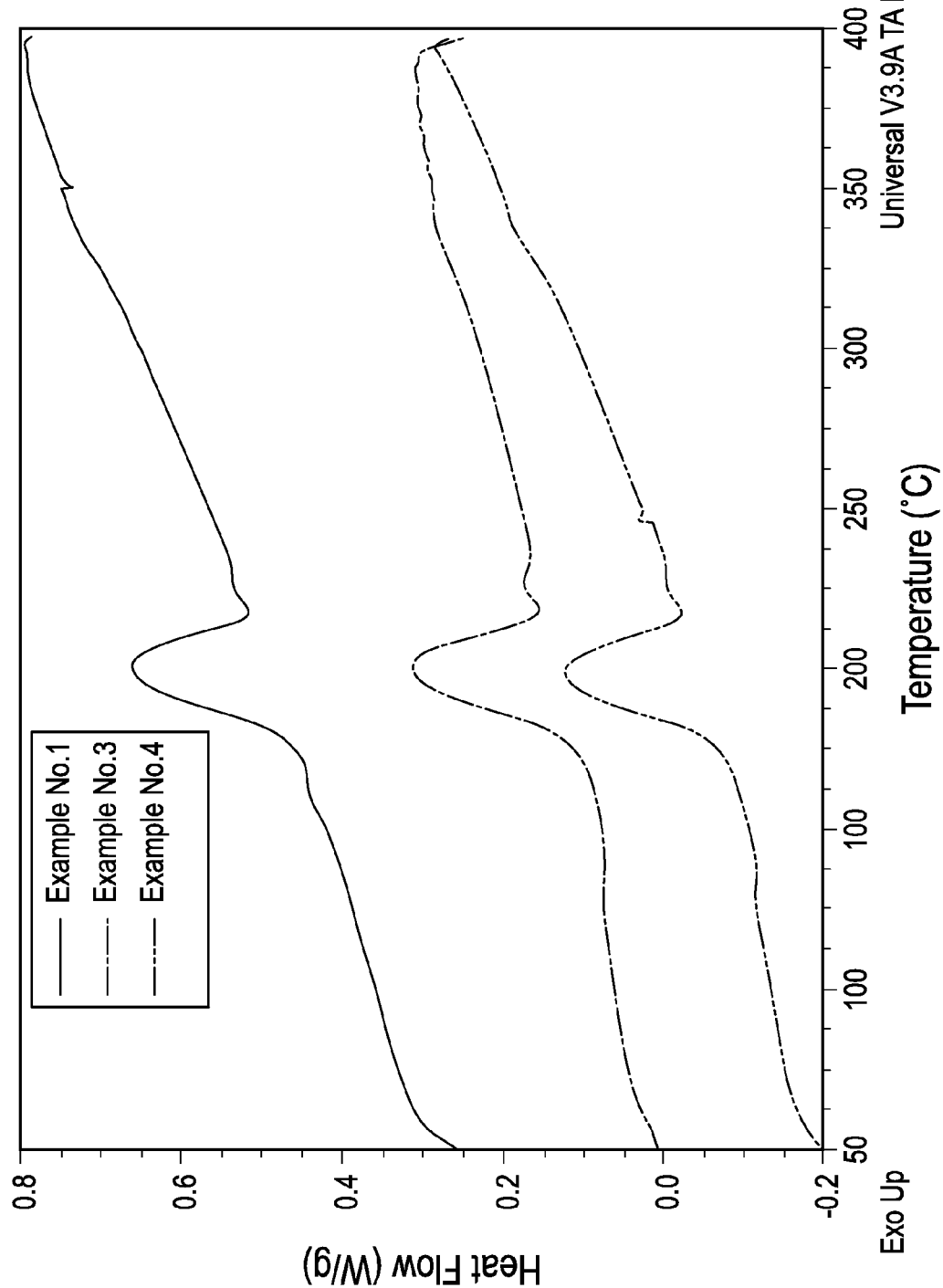
FIG. 3 is a graphical representation of the diffraction scanning calorimetry data recorded for Example Nos. 1, 3, and 4.
Figure 4:
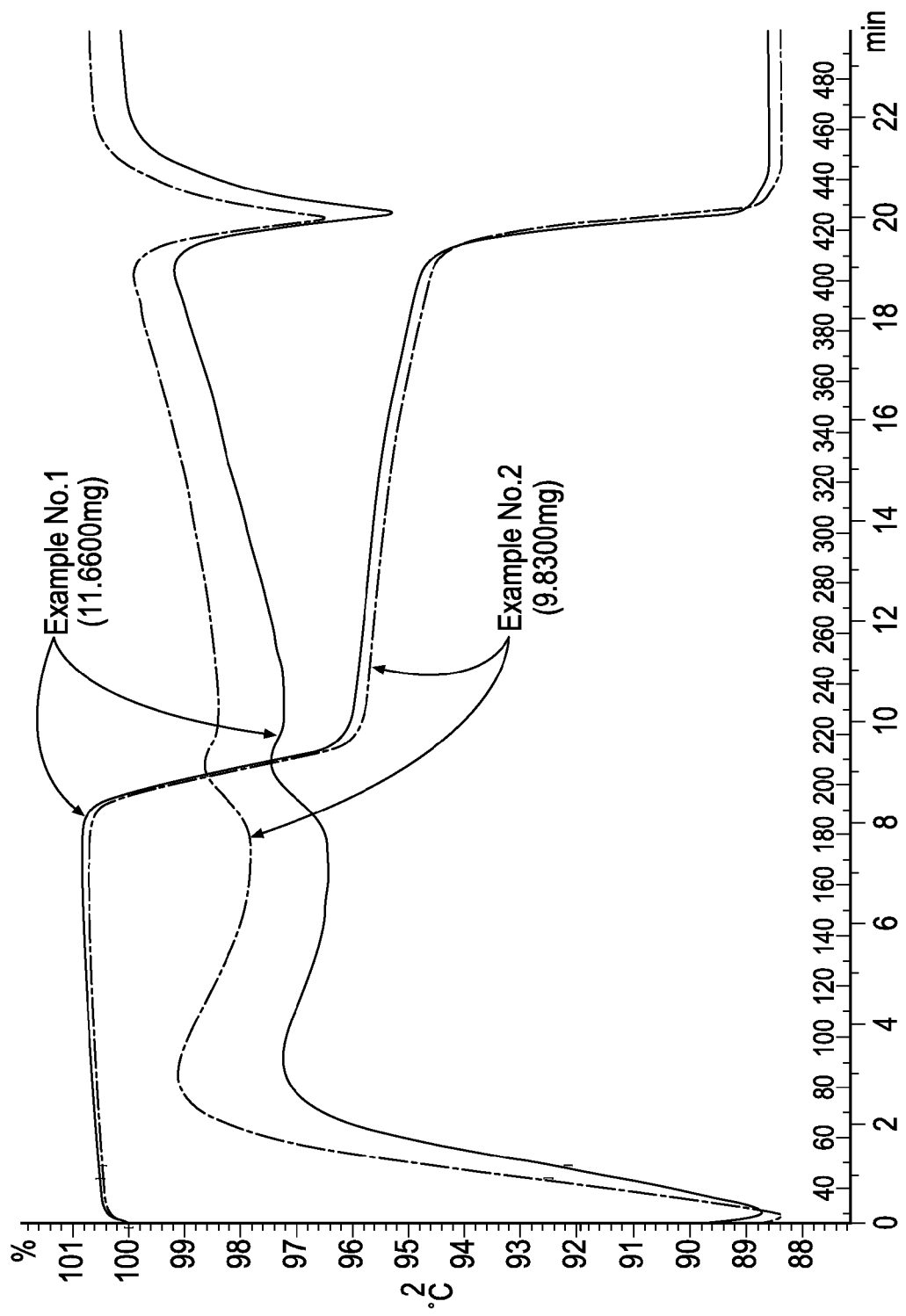
FIG. 4 is a graphical representation of the TGA-DTA data of Example Nos. 1 and 2.

4. Thermal Analysis:

Differential scanning calorimetry (DSC) was performed using a differential scanning calorimeter from TA Instruments (model no. 2920) with scan rate of 10° C./min, and thermo gravimetric analysis (TGA) was performed using a Mettler Toledo TGA/SDTA (model no. 851e) at 20° C./min to characterize thermal property of the product. Graphical representations of the data for the experimental powders are provided in FIGS. 2 through 4.

From the DSC data, the initial exothermal peak is about same for samples with and without a stabilizing agent. The samples having a stabilizing agent show slightly lower decomposition temperatures than samples using the cathode material of Example No. 1, where no stabilizing agent is present, according to TGA-DTA data. The results indicate that these stabilized AgO cathode material samples, described in Example Nos. 2-5 above, were thermally stable.

5. Electrical Properties

Figure 5:
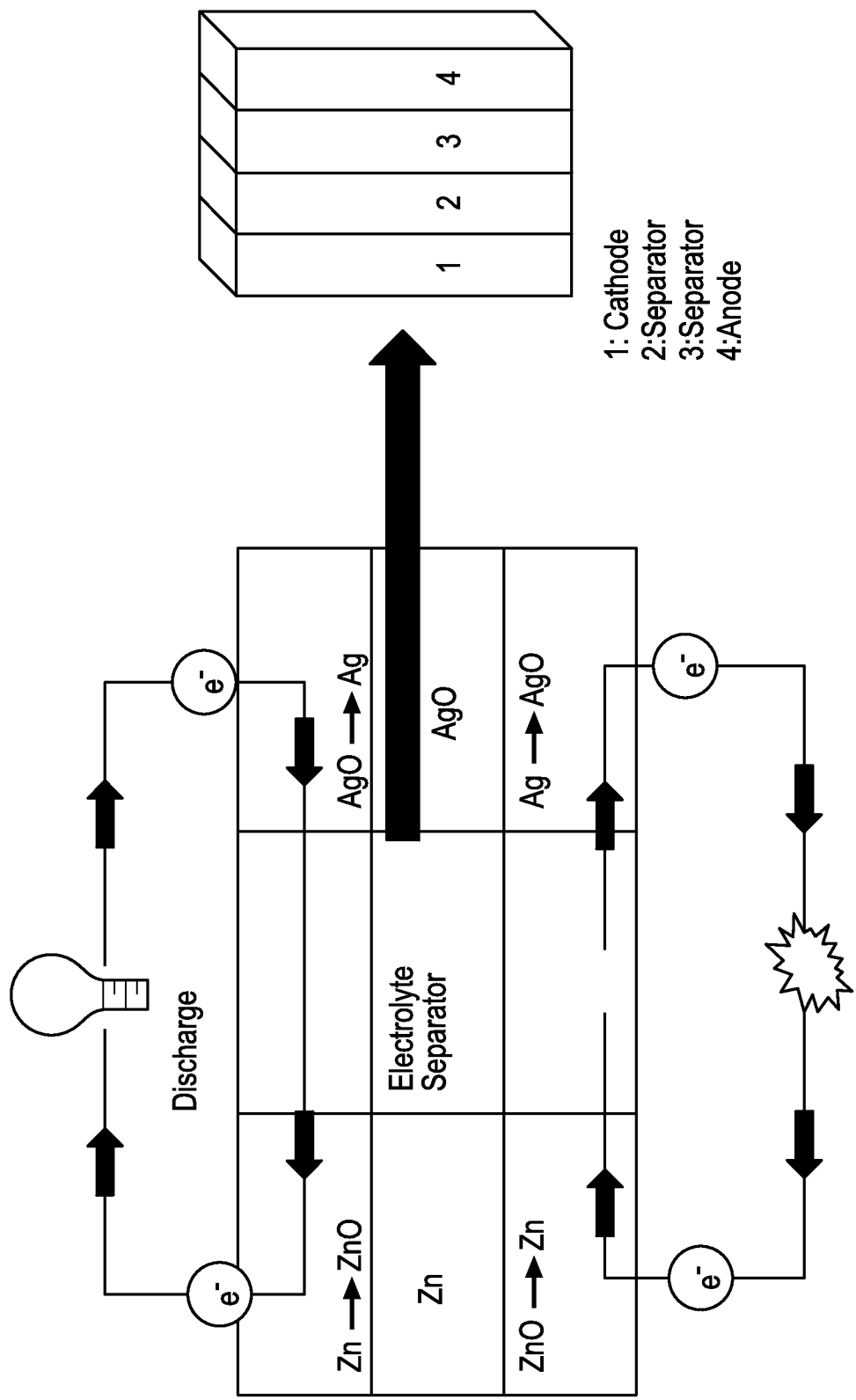
FIG. 5 is an illustration of an electrochemical test cell that was used to test the electrical properties of exemplary cathode materials of the present invention.
Figure 6:
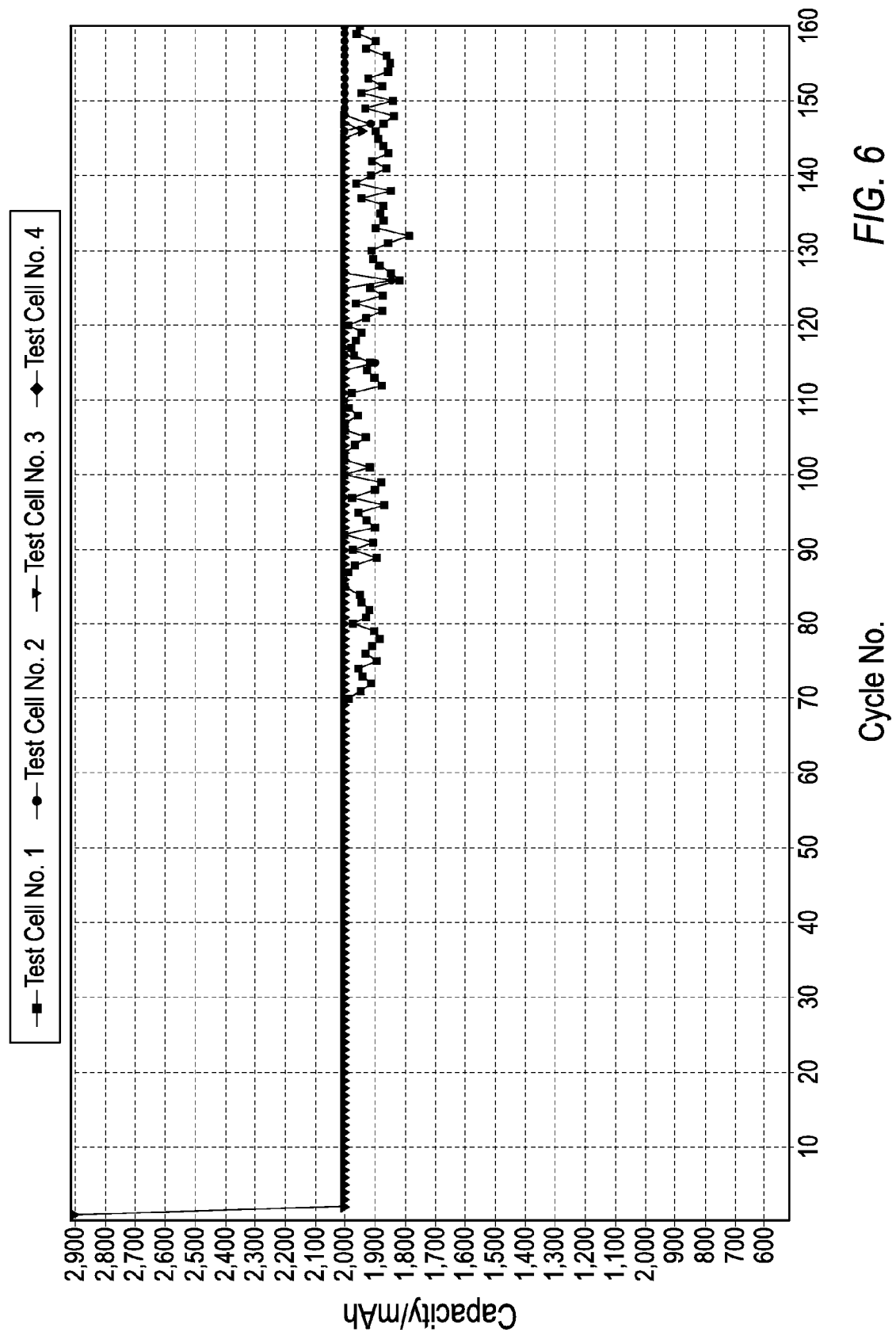
FIG. 6 is a graphical representation of cell capacities as a function of charge cycles for test cells 1-4 that are formed from cathode materials described in Example Nos. 1-4.

Test cells were constructed for evaluation of the electrical properties of the exemplary cathode materials described in Example Nos. 1-6, above. FIG. 5 schematically illustrates the arrangement order of elements used in the silver-zinc test cells. The electrolyte of aqueous alkaline is used for purpose of offering OH⁻ during charge and discharge process.

The cathode materials, described in Example Nos. 1-4, were incorporated into prismatic test cells having 2.0 Ah capacities, and the cathode materials described in Example Nos. 5 and 6 were incorporated into a prismatic test cell having a 3.0 Ah capacity.

The anodes of these test cells 1-5 were formed using 3.6 g zinc, with additives of zinc oxide (13 wt %) and $Bi_2O_3$ (0.5 wt %), and 5 wt % PTFE as a binder. The anodes were configured into 43 mm×31 mm rectangles that were pressed at 2 tons. The rectangles along with 32 wt % KOH and NaOH (0.1 g) mixed electrolyte (80:20) with additives of In/brass (0.1 wt %) were wrapped in Solupor® (commercially available from Lydall, Inc. of Rochester, N.H.) and incorporated into the test cells as depicted in FIG. 5.

Test cathodes were formed from cathode material including 3 wt % PTFE binder. The cathode material was formed into 43 mm×31 mm rectangles, pressed at 5.5 T, and, along with 32% KOH and NaOH (0.2 g) mixed electrolyte (80:20) with additives of Pb (0.4 wt %), was wrapped in SL6-8 material commercially available from the Shilong Company.

The test cells also included 2 distinct cellophane films, commercially available from Innovia Films, located between the wrapped electrodes that were soaked and filled with 32% KOH and NaOH mixed electrolyte. Table 4 describes the test cells.

Table 4: Test cells for measuring the electrical properties of cathode materials of novel cathode materials.

| Test Cell No. | Cathode Material | Amount of Anode Material (g) | Amount of Cathode Material (g) | Cathode Pouch Material |
|---|---|---|---|---|
| 1 | Example No. 1 | 3.6 | 5.85 | SL6-8 |
| 2 | Example No. 2 | 3.6 | 5.85 | SL6-8 |
| 3 | Example No. 3 | 3.6 | 5.45 | T2 |
| 4 | Example No. 4 | 3.6 | 5.85 | T2 |
| 5 | Example No. 5 | 3.6 | 5.45 | T2 |
| 6 | Example No. 6 | 4.5 | 5.45 | T2 |
| 7 | Example No. 7 | N/A | 3.60 | N/A |
| 8 | Example No. 8 | 0.514 | 0.635 | T2 |

That cathode pouch material designated with the "T2" reference number is formed from a 3-layered co-extruded material. The first layer, i.e., the layer facing the cathode is a mixture of polystyrene sulfonic acid (PSS) and polyacrylic acid (PAA) (35 wt % PAA vs. PSS). The second layer is a filled polyvinyl alcohol, and the third layer is an unfilled polyvinyl alcohol. Structurally, the second layer is interposed between the first and third layers. The first cathode later is formulated from PSS (25 wt % commercial PSS solution (Mw=1M)) and 25 wt % commercial PAA solution (192058 Aldrich Poly(acrylic acid) partial sodium salt solution average Mw ~240,000 by GPC, 25 wt. % in $H_2O$). The second cathode layer is formulated from about ~10 wt % PVA and $ZrO_2$ powder (~35 wt % $ZrO_2$ vs. PVA). And, the third layer was formulated from a 10 wt % PVA stock solution. The film was co-extruded and dried at low dryer temperatures. Each of the three layer is ~10 microns thick.

The "SL6-8" is an 8 micron thick film, that is commercially available from the Shilong Company.

The cycle life of test cells having cathodes comprising a stabilizing agent was determined by repeatedly charging and discharging the test cell to evaluate the reduction of battery capacity as a function of charge cycles. It is noted that the period of time between a discharge and a charge in two consecutive charge cycles was less than 10 minutes.

A typical charge-discharged cycling procedure is as follows:

The battery is charged with a constant current until the battery terminal voltage reached 2.03 volts or more and then the voltage is held fixed at 2.03 volts until the desired charge capacity of the cell is reached. The initial charge current is chosen to charge the battery in 5 hours. After charge the battery is allowed to rest for 10 to 30 minutes. The battery is then discharged at a constant current until the battery voltage reached 1.2 volts or until 5 hours total discharge time is reached. The current is chosen to completely discharge the battery in 5 hours. After discharge the cell is allowed to rest from 10 to 30 minutes.

Figure 7:
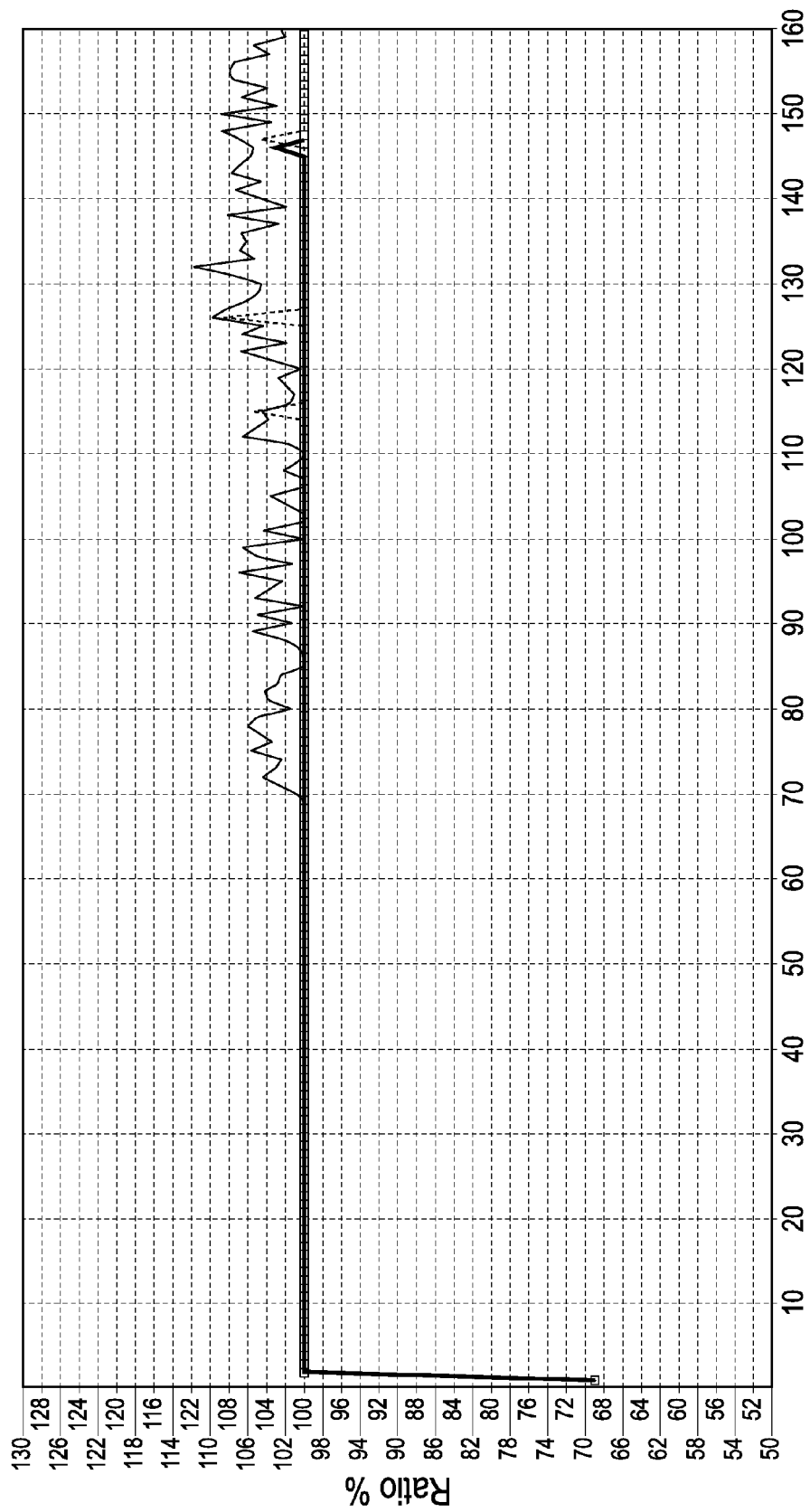
FIG. 7 is a graphical representation of the ratio of the cell discharge to charge as a function of charge cycles for test cells 1-4 that are formed from cathode materials described in Example Nos. 1-4.
Figure 8:
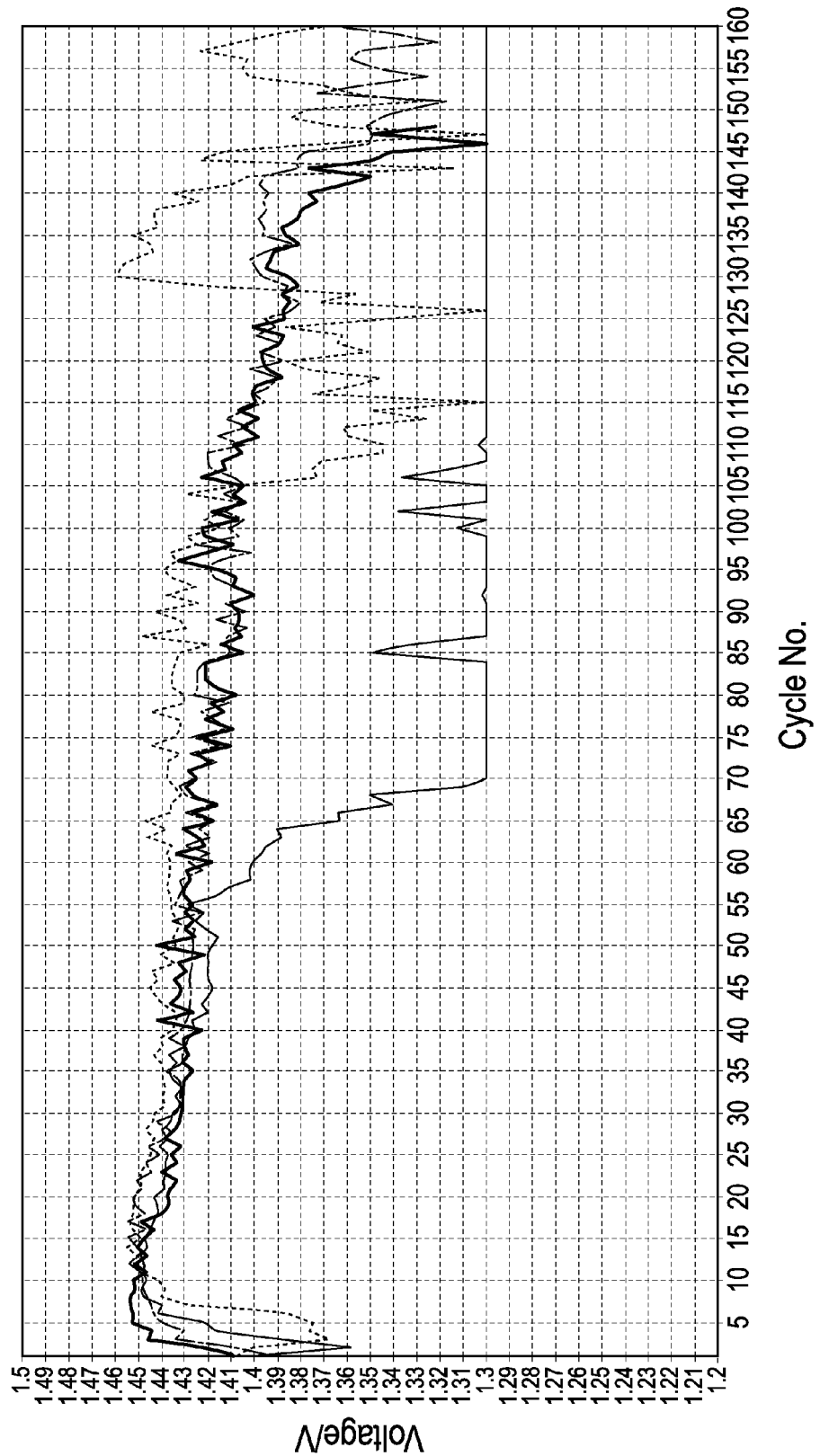
FIG. 8 is a graphical representation of the voltage at the end of discharge as a function of charge cycles for test cells 1-4 that are formed from cathode materials described in Example Nos. 1-4.
Figure 9:
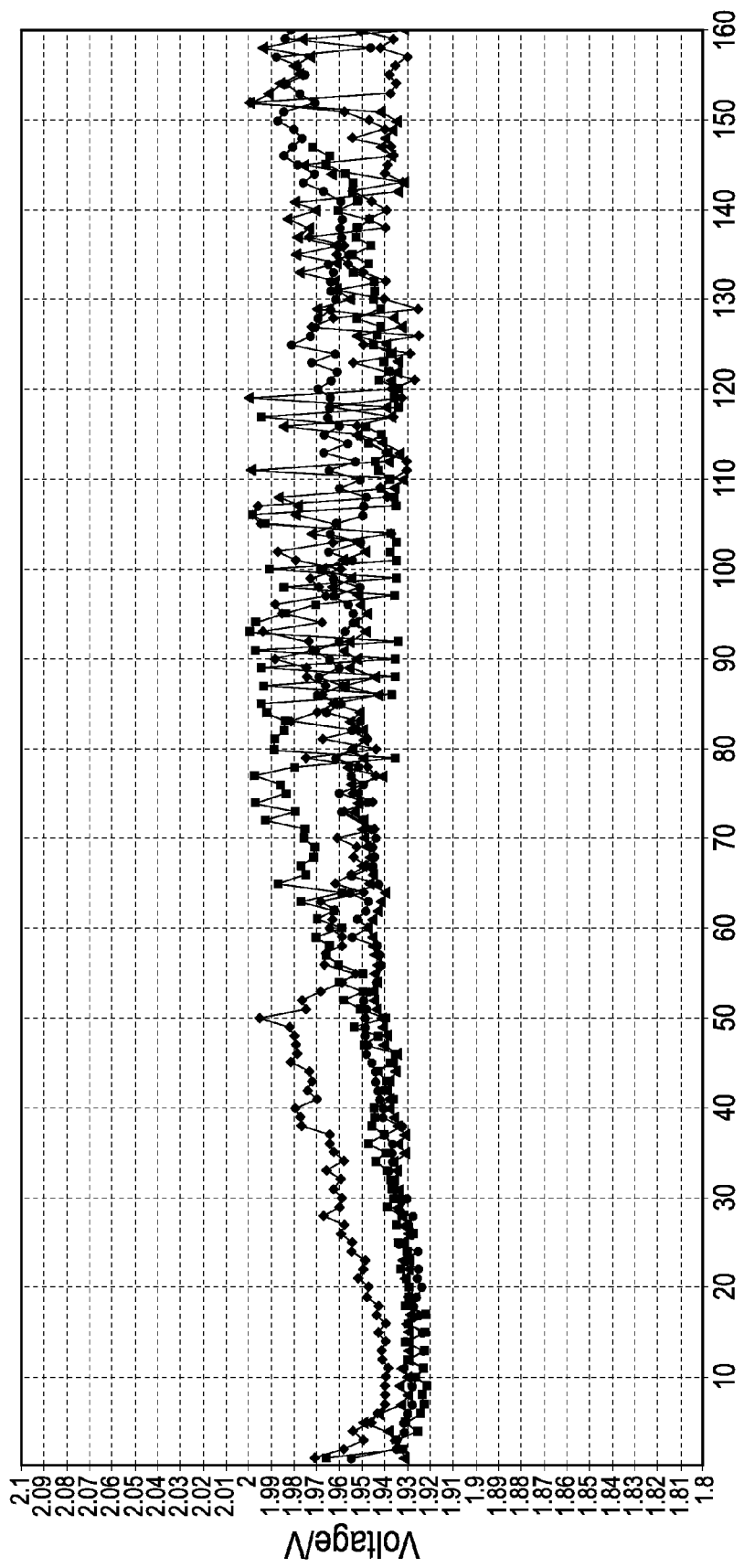
FIG. 9 is a graphical representation of the voltage at the end of charge as a function of charge cycles for test cells 1-4 that are formed from cathode materials described in Example Nos. 1-4.
Figure 10:
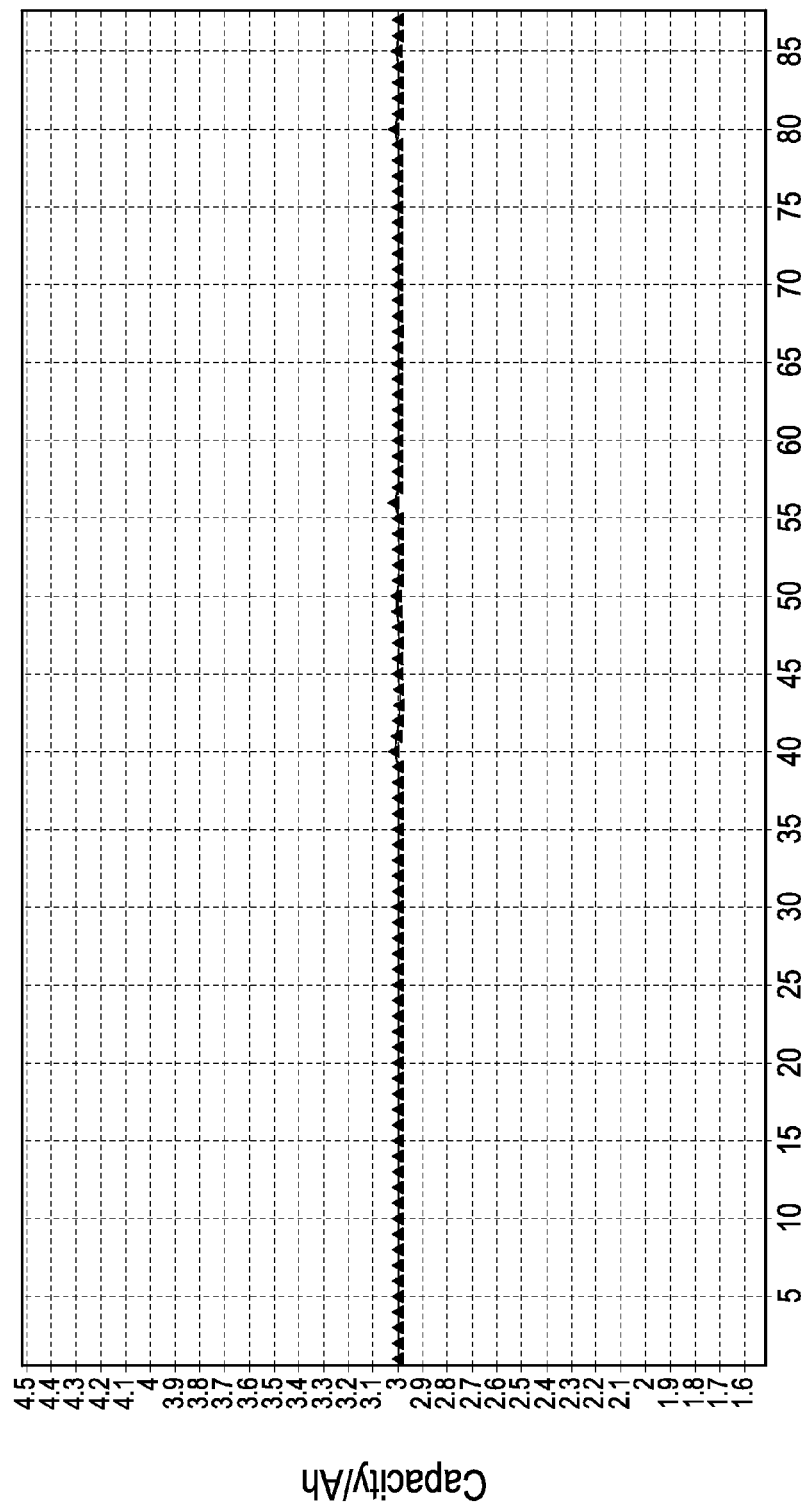
FIG. 10 is a graphical representation of cell capacities at a function of charge cycles for test cell 5 that is formed from cathode materials described in Example No. 5.
Figure 11:
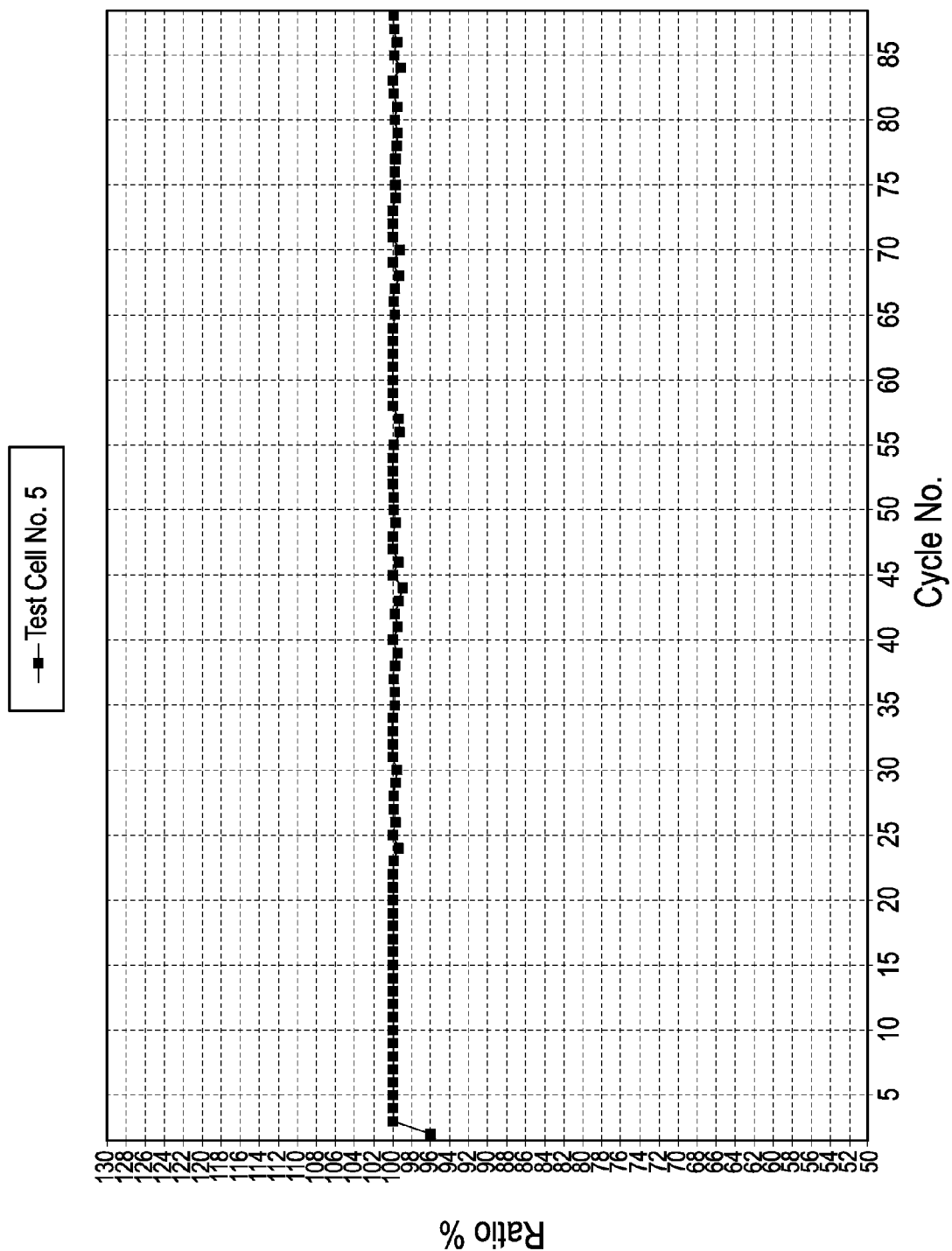
FIG. 11 is a graphical representation of the voltage at the end of discharge as a function of charge cycles for test cell 5 that is formed from cathode materials described in Example No. 5.
Figure 12:
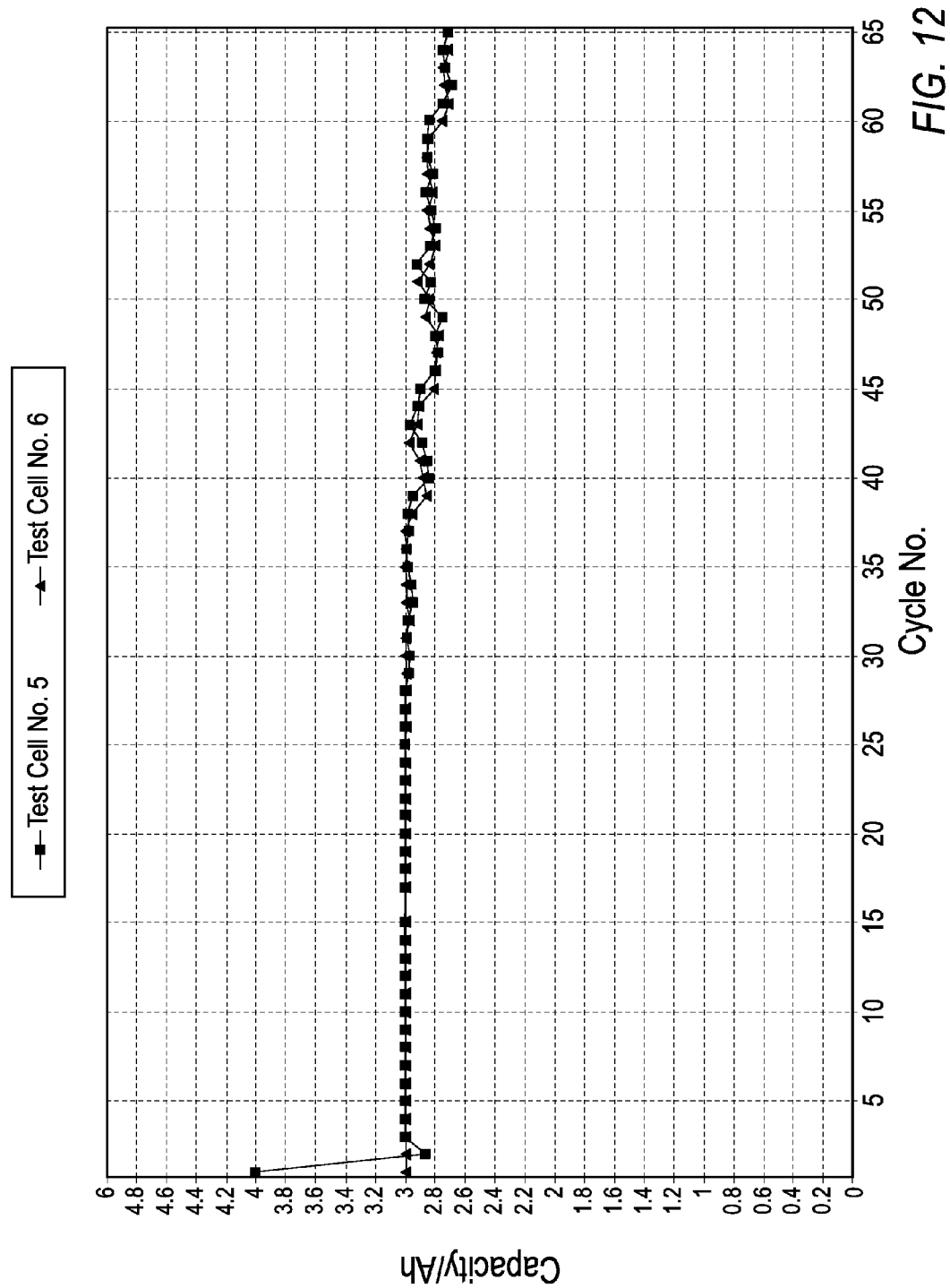
FIG. 12 is a graphical representation of cell capacities as a function of charge cycles for test cell 6 that is formed from cathode materials described in Example No. 6.
Figure 13:
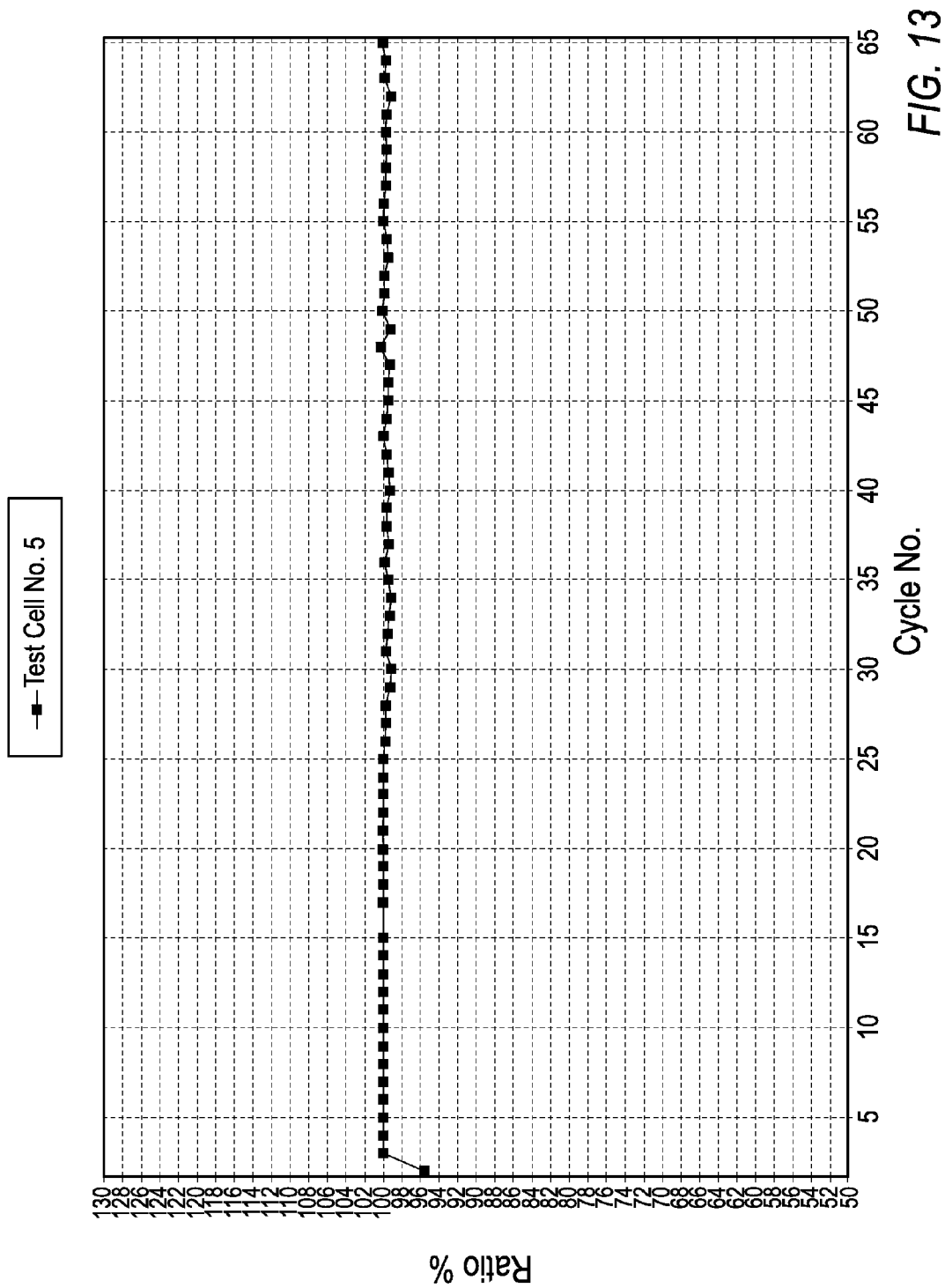
FIG. 13 is a graphical representation of the voltage at the end of discharge as a function of charge cycles for test cell 6 that is formed from cathode materials described in Example No. 6.
Figure 14A:
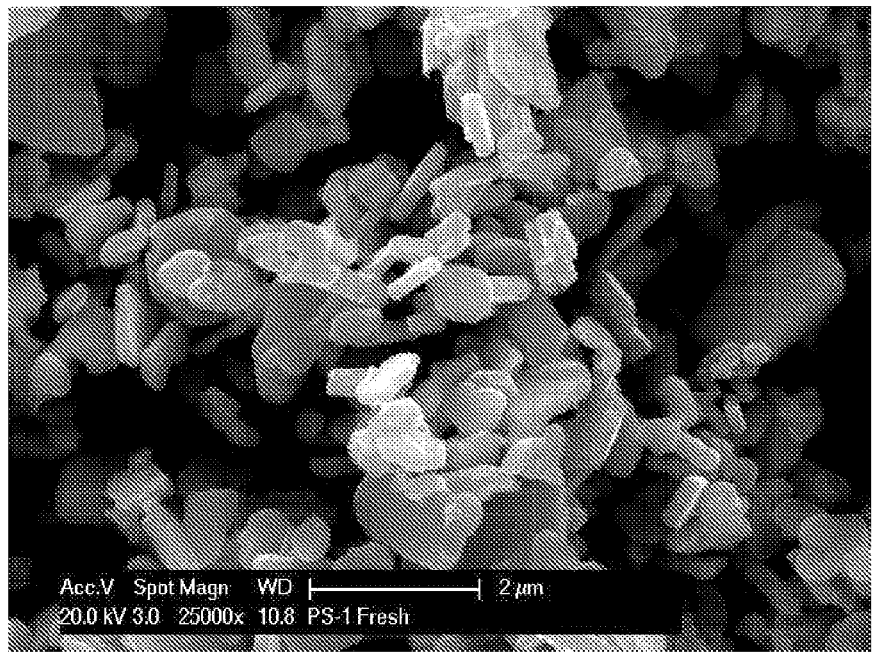
FIG. 14A is an SEM image of AgO cathode material of Example No. 1 prior to charge cycling.
Figure 14B:
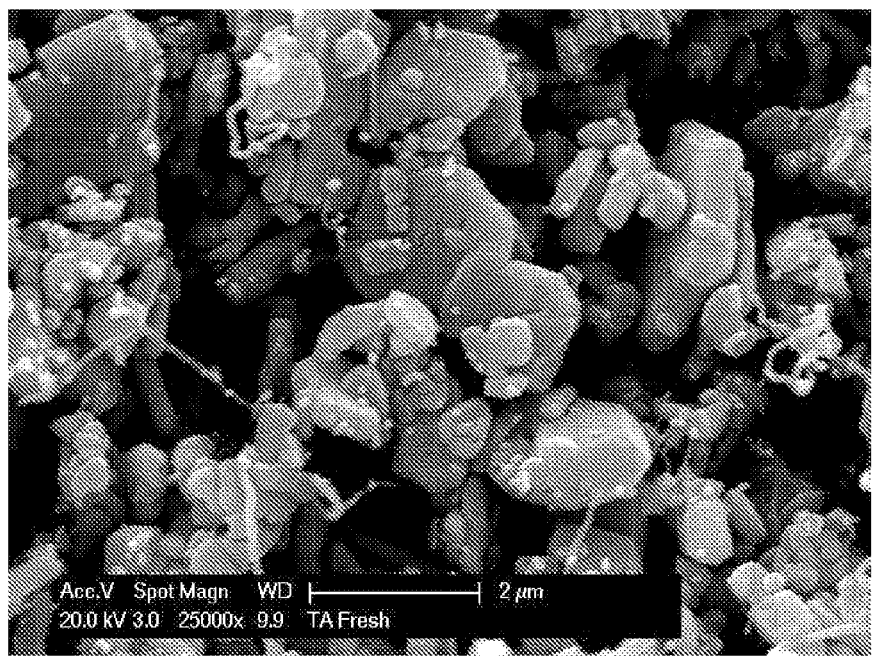
FIG. 14B is an SEM image of AgO cathode material of Example No. 8, prior to cycling.
Figure 15A:
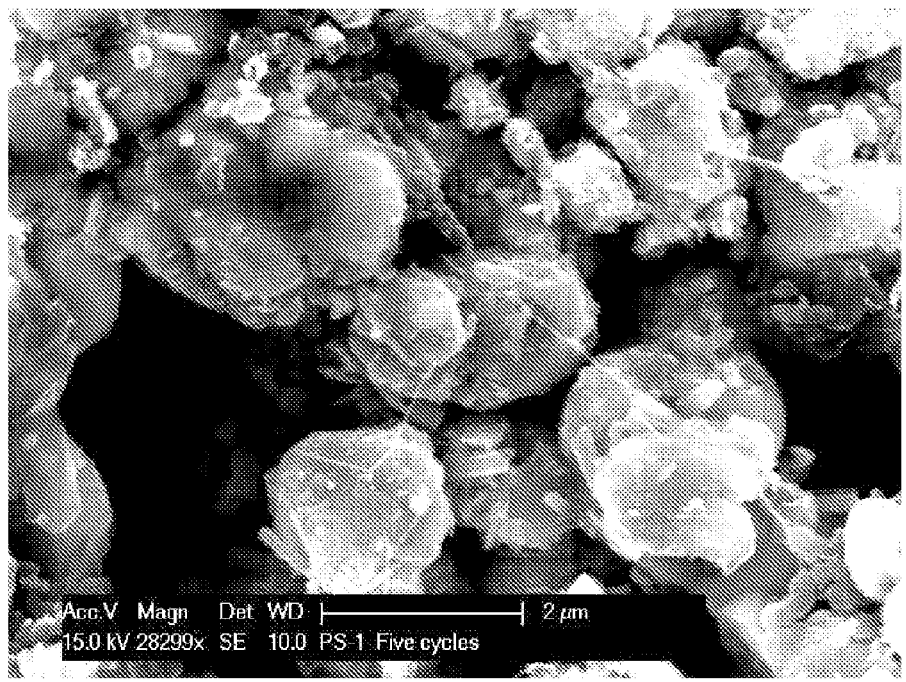
FIG. 15A is an SEM image of AgO cathode material of Example No. 1 after 5 charge cycles.
Figure 15B:
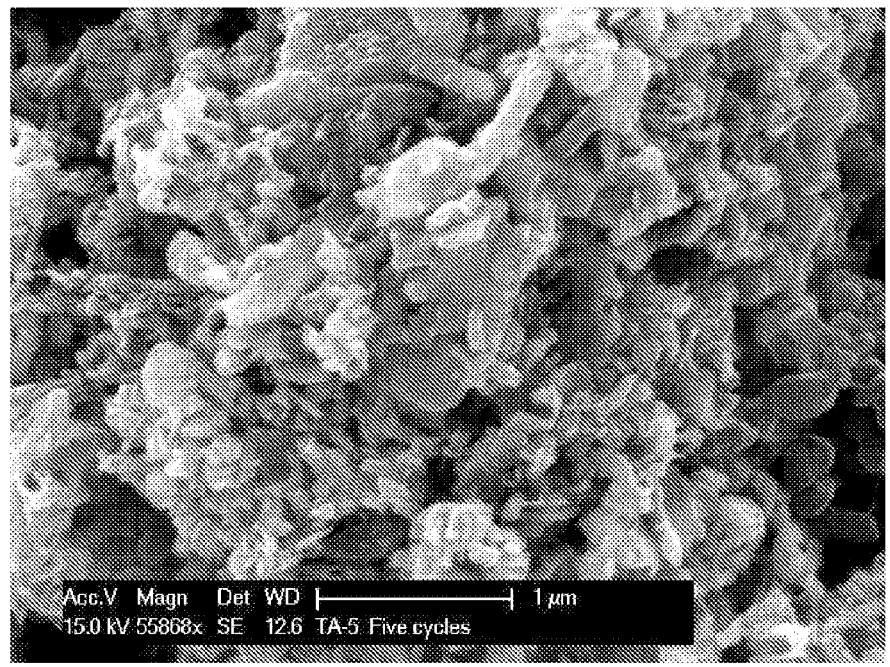
FIG. 15B is an SEM image of AgO cathode material of Example No. 8 after 5 charge cycles.

Using the process above, the cycle life of the test cells was determined to be excellent and at least comparable to that of the test cell having a cathode lacking a stabilizing agent. It is observed in FIGS. 6-15B that test cells having cathodes with a stabilizing agent have more desirable discharge coefficients, voltages at end of discharge, voltages at end of charge during cycling, at least in their early stages (e.g., about 160 charge cycles), and material properties, i.e., the silver particles in an exemplary cathode material comprising a stabilizing agent shows decreased aggregation after cycling than a cathode material lacking a stabilizing agent. Furthermore, the discharge coefficients of test cells, shown in FIG. 7, demonstrate that cathodes having a stabilizing agent are more Coulombicly efficient that those without the stabilizing agent.

Overall, this data demonstrates that the new composite cathodes having stabilizing agents have excellent electrochemical properties.

OTHER EMBODIMENTS

The embodiments disclosed herein have been discussed for the purpose of familiarizing the reader with novel aspects of the invention. Although preferred embodiments of the invention have been shown and described, many changes, modifications and substitutions may be made by one having ordinary skill in the art without necessarily departing from the spirit and scope of the invention as described in the following claims.

What is claimed is:

1. A cathode for use in a rechargeable battery comprising:
a cathode active material comprising:
   a stabilizing agent comprising a powder having a mean particle diameter of from about 5 nm to about 210 nm; and
   silver,
   wherein the powder comprises $SiO_2$ particles, $ZrO_2$ particles, and ZnO particles, and the silver comprises Ag, AgO, $Ag_2O$, $Ag_2O_3$, AgOH, $Ag(OH)_2$, $Ag(OH)_3$, AgOOH, AgONa, AgOK, AgOLi, AgORb, AgOONa, AgOOk, AgOOLi, AgOORb, $AgCuO_2$, $AgFeO_2$, $AgMnO_2$, $Ag_2CuMnO_4$, any hydrate thereof, or any combination thereof.

2. The cathode of claim 1, wherein the cathode active material comprises from about 0.005 wt % to about 0.5 wt % of the stabilizing agent.

3. The cathode of claim 1, wherein the ZnO particles are doped with a dopant comprising $Al_2O_3$, iron oxide, indium oxide, or any combination thereof.

4. The cathode of claim 3, wherein the ZnO particles are doped with a dopant comprising $Al_2O_3$.

5. The cathode of claim 4, wherein the ZnO particles comprise from about 1 wt % to about 10 wt % of $Al_2O_3$ by weight of the ZnO particles.

6. The cathode of claim 1, wherein the cathode further comprises a binder.

7. A rechargeable battery comprising
a cathode comprising
   a cathode active material comprising silver and a stabilizing agent;
   wherein the stabilizing agent comprises a powder having a mean particle diameter of from about 5 nm to about 210 nm; the powder comprises $SiO_3$ particles, $ZrO_2$ particles, and ZnO particles; and the silver comprises Ag, AgO, $Ag_2O$, $Ag_2O_3$, AgOH, $Ag(OH)_2$, $Ag(OH)_3$, AgOOH, AgONa, AgOK, AgOLi, AgORb, AgOONa, AgOOk, AgOOLi, AgOORb, $AgCuO_2$, $AgFeO_2$, $AgMnO_2$, $Ag_2CuMnO_4$, any hydrate thereof, or any combination thereof.

8. The rechargeable battery of claim 7, wherein the cathode active material comprises from about 0.005 wt % to about 0.5 wt % of the stabilizing agent.

9. The rechargeable battery of claim 7, wherein the ZnO particles are doped with a dopant comprising $Al_2O_3$, iron oxide, indium oxide, or any combination thereof.

10. The rechargeable battery of claim 9, wherein the ZnO particles are doped with a dopant comprising $Al_2O_3$.

11. A cathode for use in a rechargeable battery comprising:
a cathode active material comprising:
   a stabilizing agent comprising $SiO_2$ particles, $ZrO_2$ particles, and ZnO particles; and
   silver,
   wherein the ZnO particles are doped with $Al_2O_3$ and the silver comprises AgO that is coated with a coating agent comprising Pb, and the AgO is doped with Ga.

12. A rechargeable battery comprising a cathode according to claim 11.

* * * * *